United States Patent
Watanabe et al.

(10) Patent No.: US 7,023,577 B2
(45) Date of Patent: Apr. 4, 2006

(54) IMAGE PROCESSING APPARATUS, IMAGE PROCESSING METHOD AND RECORDING MEDIUM WITH COLOR IMAGE COMPACTING

(75) Inventors: Tatsumi Watanabe, Kyoto-fu (JP); Akio Kojima, Osaka-fu (JP); Yasuhiro Kuwahara, Osaka-fu (JP); Toshiharu Kurosawa, Osaka-fu (JP); Hirotaka Oku, Osaka-fu (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 1122 days.

(21) Appl. No.: 09/725,946

(22) Filed: Nov. 30, 2000

(65) Prior Publication Data

US 2002/0051145 A1   May 2, 2002

(30) Foreign Application Priority Data

Nov. 30, 1999  (JP) .......................... 11-339552

(51) Int. Cl.
     *G06F 15/00*   (2006.01)

(52) U.S. Cl. .................. 358/1.9; 358/2.1; 358/515; 358/518

(58) Field of Classification Search ............... 358/1.9, 358/2.1, 515, 518, 450, 453, 462, 538, 540
See application file for complete search history.

(56) References Cited

U.S. PATENT DOCUMENTS 5,128,748 A * 7/1992 Murakami et al. .......... 358/500
6,021,257 A * 2/2000 Chikauchi ................. 358/1.9

FOREIGN PATENT DOCUMENTS

| EP | 0 518 619 | 12/1992 |
| EP | 0 606 781 | 7/1994 |
| EP | 0 693 738 | 1/1996 |
| JP | 7-25072 | 1/1995 |
| JP | 11-98343 | 4/1999 |

* cited by examiner

*Primary Examiner*—Twyler M. Lamb

(57) ABSTRACT

The following means are adopted in the image processing apparatus according to the present invention. First, an object image separating means separate a color image described in an outputting control language into the command image generated by the drawing command and the photo image generated by the image data having color information per pixel, such as a bitmap data, so that the command image and the photo image are color-processed separately. As for the command images, there is provided command image processing means to color-process color palette information given to a region specified by the drawing command and to generate a first image having color information by the pixel, such as a bitmap image. As for the photo images, there is provided photo image processing means to color-process and generate a second pixel image. In this color-processing, the photo image is divided into a plurality of image blocks. Then at least one kind of colors or representative colors among the colors making up the image block is decided on.

55 Claims, 20 Drawing Sheets

IMAGE PROCESSING APPARATUS, IMAGE PROCESSING METHOD AND RECORDING MEDIUM WITH COLOR IMAGE COMPACTING

BACKGROUND OF THE INVENTION

1. Field of the Invention

The present invention relates to an image processing apparatus and image processing method for outputting an inputted image data by matching the color specification to the space for reproduced colors in output units such as color printers, facsimiles and displays.

2. Description of the Prior Art

With an upgraded performance of jet printers and digital still cameras, coupled with their affordability in recent years, more home users are interested in printing an image data with a color printer.

One of the most viable ways for home users is to print out an image data displayed and edited on a color monitor connected to a computer. FIG. 20 shows a conceptual diagram of print processing using the conventional printer disclosed in the Japanese patent application laid open under No. 7-25072.

An application 172 installed on a computer 170 usually uses a drawing command of its operating system to produce and display figure data such as arrows and ellipses. And when the user of the computer 170 instructs the application 172 to print, the operating system converts the figure data produced as above into drawing information a printer driver 173 can interpret, and forwards it to the printer driver 173. The printer driver 173 converts the received drawing information into a printing control language that can be interpreted by the printer, and temporarily holds in a memory storage 174 before forwarding it to a printer 171.

The printing control language is a printer control code (language) for making a printing image of image data, and in most cases, has built-in functions, including drawing figures and printing simple letters. Among the typical printing control languages is a page description language used in a page printer that prepares and outputs printing images by the page. In this case, image data are expressed by the page in the page description language and sent to the printer. A microprocessor within the printer analyzes the data, producing an actual printing image. The typical printing control languages include PostScript, HP-PCL, LIPS, ESC/Page, and PRESCRIBE. Described contents vary depending on the language used but generally speaking, in the case of graphic data or text data, information such as the kind of line, start/end point, shape of a figure, color palette information showing the colors of the figure is described as header information on every detail of each of the figures expressed on one page.

On the printer side, a rasterizing means 175 creates an image data (bitmap data for example) which expresses color data by the pixel for all the figures based on the printing control language received from the memory storage 174 to be held in a page memory 176. And a pixel unit color processing means 177 carries out a series of color processing on the bitmap data as follows.

First, the bitmap data for one page is processed. That is, color palette information expressed by additive mixture of color stimuli such as R (red), G (green), B (blue) etc. held by the bitmap data is color-converted into a subtractive mixture of color stimuli of C (cyan), M (magenta) and Y (yellow). Then with consideration given to the color reproducibility characteristics of the printer, the color converted into the subtractive mixture of color stimuli as mentioned above is modified and brought closer to the color to be reproduced on a monitor. Also, with consideration given to the color reproducibility characteristics of the printer, color space compression is performed to erase the zones of colors the printer cannot reproduce. In addition, K (black) is generated and added to the data—a black generation to produce a four-component mixture—and a gamma correction is performed to adjust the density.

Pixel unit color processing means 177 color-process the image data (CMYK data) per pixel, which is converted into the output gradation level of the printer by gradation processing means 6 and forwarded to a printer engine 7.

The following technique is also possible. That is, bitmap image data restored by rasterizing means 175 is color-processed per pixel by pixel unit color processing means 177, and the data adjusted to the gradation level of outputting equipment by gradation processing means 6 is held in the page memory 176 and handed over to a printer engine 7 by video output.

The conventional image processing apparatus restores image data described in the printing control language in printer driver 173 to bitmap image in the order in which they are inputted, without distinguishing between the command image generated by the drawing command and the photo image that can be expressed only with bitmap data like photo. And because the restored bitmap image is color-processed per pixel, a huge page memory is required to hold bitmap data temporarily, greatly prolonging the color-processing time.

Meanwhile, the image data inputted in the printer is described in a language the printer can interpret, namely a printing control language. And the image data inputted in the display unit is described in a language the display unit can interpret (hereinafter referred to as display control language). In addition, image data inputted in the Graphical Device Interface (GDI) which handles commonly processing for printing and processing for display on Windows is described in a language the GDI can interpret (hereinafter referred to as GDI language).

Here, to convert image data described in the display control language into data suitable for display in the display unit or to process image data described in the GDI control language by the GDI, a problem similar to the case where image data described in the printing control language is handled as above takes place.

SUMMARY OF THE INVENTION

To overcome the disadvantages and deficiencies of the prior art as stated above, it is an object of the present invention to provide an image processing apparatus and image processing method to separate an object color image data into command image and photo image, and then to process each of them in such a way that color processing can be done at a high speed.

To solve the problem encountered with the prior art, the following means are adopted in the image processing apparatus according to the present invention.

First, an object image separating means separate a color image described in an outputting control language (printing control language, display control language or GDI control language) into the command image generated by the drawing command and the photo image generated by the image data having color information per pixel, such as a bitmap data, so that the command image and the photo image are color-processed separately. Here, the term "color-process" means converting the color data of the command image or the photo image into color data depending on the output units such as printer and display.

As for the command images, there is provided command image processing means to color-process color palette information given to a region specified by the drawing command and to generate a first image having color information by the pixel, such as a bitmap image, (hereinafter referred to as a pixel image). Since color-processings to the region are performed in the lump, the required page memory for color-processing is reduced, shortening the time for color-processing.

As for the photo images, there is provided photo image processing means to color-process and generate a second pixel image. In this color-processing, the photo image is divided into a plurality of image blocks. Then at least one kind of colors or representative colors among the colors making up the image block is decided on.

And this representative colors alone are color-processed. Therefore, color-processing time is greatly reduced because color-processing is not necessarily performed on all the colors of the image block.

The representative colors are decided on by deriving a plurality of representative color vectors from a group of color vectors with the color data of the pixels in the image block as factor while taking account of the distance variance of the color vector group.

Furthermore, image synthesizing means is provided to produce a printing image by synthesizing the first pixel image and the second pixel image, enabling high speed color-processing even if the color image is a combined image of a command image and a photo image.

BRIEF DESCRIPTION OF THE DRAWINGS

Further aspects and advantages of the invention will be more apparent from the following description taken together with the accompanying drawings, in which.

DESCRIPTION OF THE PREFERRED EMBODIMENTS

In the present embodiment, image data to be processed, include image data described in the printing control language, image data described in the display control language and image data described in the GDI control language.

And the term "color-processing" means performing color-related process depending on the characteristics of output unit that is adapted. For example, in case the outputting control language is the printing control language, the term covers all kinds of color processings that are done by the pixel, including color conversion of color data expressed by an additive mixture of color stimuli such as RGB into a subtractive mixture of color stimuli of C (cyan), M (magenta) and Y (yellow), color correction and color space compression or gamut mapping to correct the CMY data into colors that can be reproduced by the printer engine 7, black generation to add K (black) to the corrected CMY to make it four-color component and gamma correction to adjust the outputting (density correction). In case the outputting control language is the display control language, the term denotes processing to convert color data, an object for RGB processing, into color data that can be expressed by the display, and gamma correction for expressing on printer or display.

Embodiment 1

Figure 1:
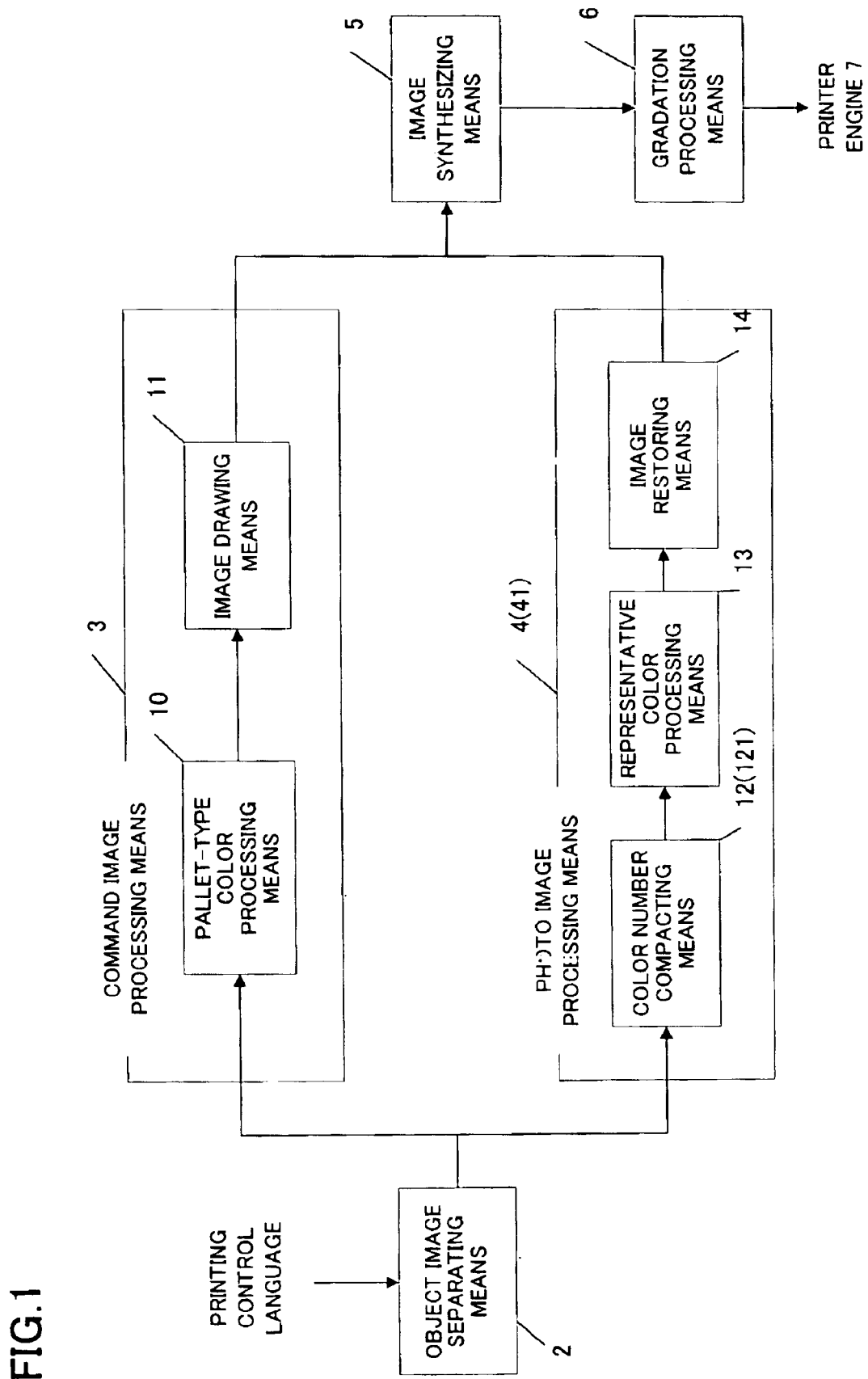
FIG. 1 is a block diagram showing the arrangement of the image processing apparatus of a first embodiment according to the present invention.
Figure 2:
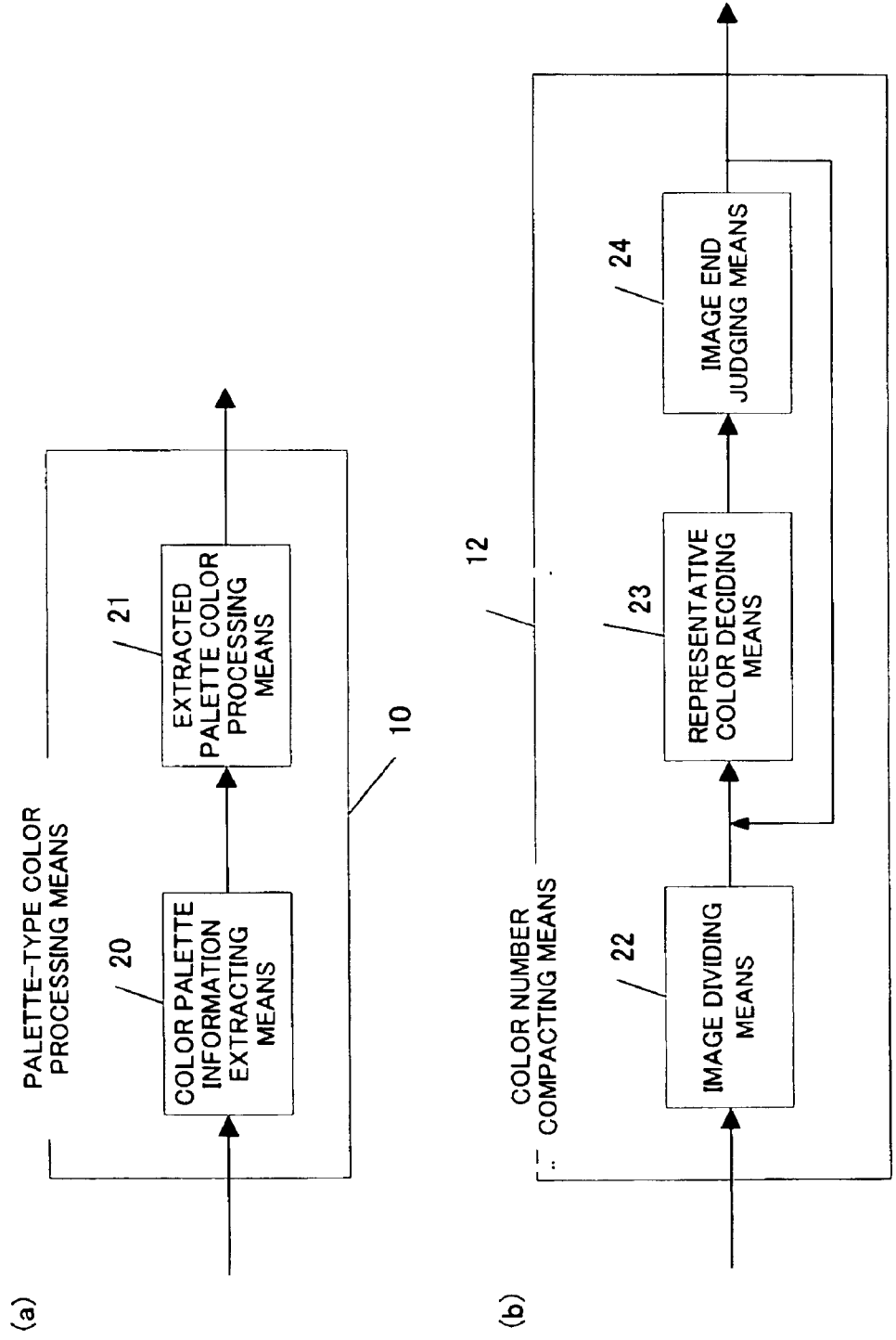
FIG. 2 is a block diagram showing the concept of palette-type color processing means and color number compacting means.
Figure 3:
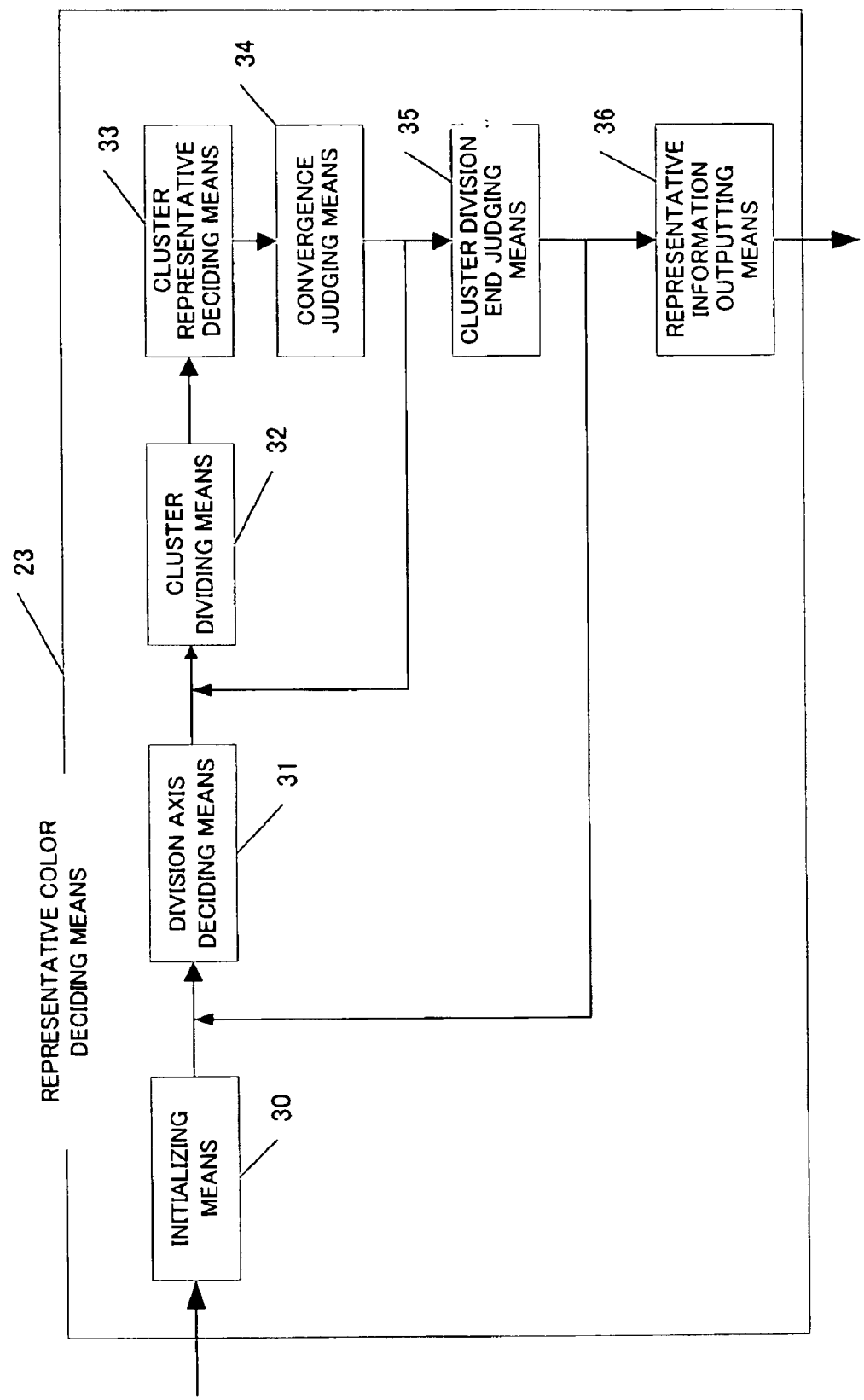
FIG. 3 is a block diagram showing the concept of representative color deciding means.

FIGS. 1, 2 and 3 show arrangements of an image processing apparatus of the first embodiment of the present invention. In the example, a printer is used as output unit and the printing control language is used as outputting control language.

A printer driver built in a computer converts a color image, an object to be outputted, into printing control language 1, a code (language) the printer can interpret. This printing control language 1 is often provided with such expanded functions as figure drawing along with simple letter printing. Among the typical printing control languages is the page description language as mentioned above.

Printing control languages generally contain descriptions which tells if the color image is command images generated by the drawing command such as graphic data and text data or photo images having color information by the pixel (bitmap for example).

In case the color image is a command image, printing control language 1 has information describing every detail of figures to be printed. The information includes tag information on command image and also such information as the kind of lines, starting point and end point of lines, shapes of figures, color palette showing the colors of the figures. In case the color image is a photo image, the descriptions in printing control language 1 include tag information on photo image and information on location and size of the image etc. Contained after that is color data for the respective pixels (R (red), G (green), B (blue)) in predetermined order that constitute the photo image.

Under that setup, printing control language 1 is first inputted into object image separating means 2, which distinguishes if the color image described in the printing control language is a command image or a photo image, based on the tag information. If it is a command image, object image separating means 2 forwards the printing control language 1 to command image processing means 3. If it is a photo image, the printing control language 1 is forwarded to photo image processing means 4.

The printing control language 1 identified as command image by object image separating means 2 is inputted into color palette information extracting means, which constitutes palette-type color processing means 10. This color palette information extracting means 20 extracts color palette information expressing the colors for the respective figures within the command image.

There are a number of methods to set up colors for the respective figures on the command image. But since the color image here is constituted of figures having a plurality of uniform colors in many cases, it is a common practice to specify pre-set color data (color palette) and color palette information indicating the numbers (The numbers correspond to each color palette of each system. In other words, each system has its own number that corresponds to a given color palette.) This color palette is expressed by an additive mixture of color stimuli like RGB or the like. In the present invention, color palette information on the respective figures within the command image is extracted by color palette information extracting means 20 and forwarded to extracted palette color processing means 21. Then, the extracted palette color processing means 21 performs color processing on the color palette for the respective figures. The command image thus color-processed is inputted into image drawing means 11 where a bitmap image is generated. The drawing image thus obtained is held temporarily in a temporary memory (not shown).

On the other hand, the printing control language 1 identified as photo image by object image separating means 2 is forwarded to photo image processing means 4. Color number compacting means 12 of photo image processing means 4 is made of image dividing means 22, representative color deciding means 23 and image end judging means 24 as shown in FIG. 2(b).

Figure 4:
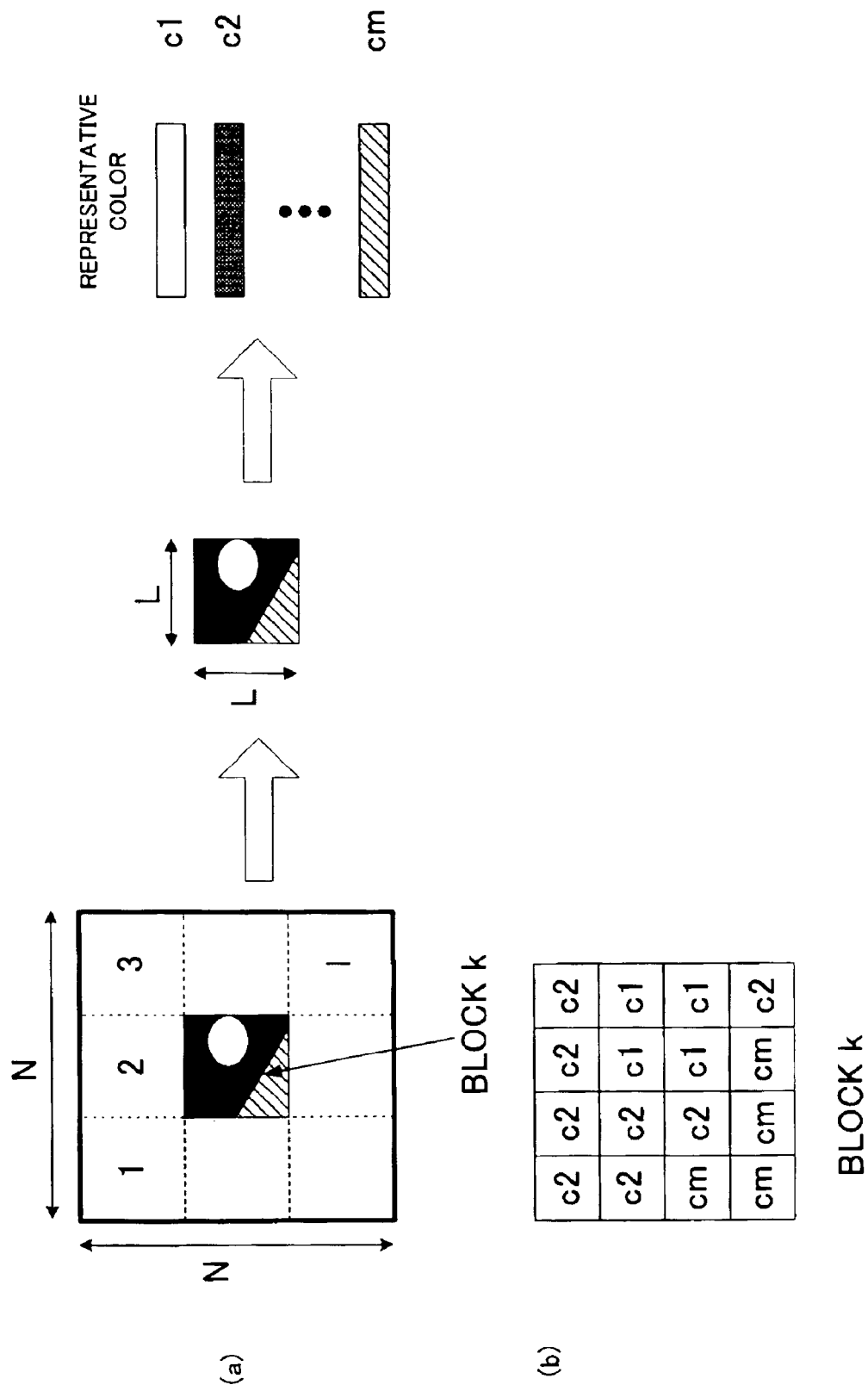
FIG. 4 is a conceptual diagram showing the division of an image and the way of deciding on a representative color.

The photo image data inputted in image dividing means 22 is first divided into a plurality of image blocks (1), (2) . . . (k) . . . (l) as shown in FIG. 4(a). As will be described later, representative color deciding means 23 decides on specific m kinds (m: a finite natural number) of representative colors (for example, c1, c2, . . . , cm) as color data representing the color data distribution in the respective image blocks.

And three-color RGB data the respective pixels within the respective image blocks have is converted through the representative colors into information on colors with m being the maximum, and then held. For example, image block k is converted into information of three colors—c1, c2 and cm as shown in FIG. 4(b). Such processing to decide the representative color is performed the same way on all the image blocks obtained by image dividing means 22. And image end judging means 24 check whether representative color data are obtained on all the image blocks.

Representative color processing means 13 performs color-processing (RGB system→CMYK system) on the representative colors decided on as described above. And on the basis of the representative color data color-processed here and information as to which cluster the color data in the respective pixels in the image block belong, image restoring means 14 approximately reproduces color data in the respective pixels in the image blocks. Image restoring means 14 restores images within all the image blocks obtained from the photo image and holds the restored images temporarily in the temporary memory. Through this processing, that is, if a photo image with N×N pixels are divided in image blocks of an L×L pixel size and the respective image blocks are approximated to representative color data numbering m, (N/L)×(N/L) color-processings will do while N×N color-processings are needed in the prior art. If, for example, L=16, m=8, the number of color-processings required is 1/32. Considering that the time for color-processing by the pixel is one of the factors consuming much time in print outputting, the present invention can substantially save the outputting time.

Now, decision of representative colors will be described.

FIG. 3 is a block diagram of representative color deciding means 23. Here, a clustering technique is adopted in which representative colors within the image blocks are derived by dividing the color data distribution of pixels within the object image block into a plurality of clusters (lumps). There are a number of kinds of clustering techniques. The clustering technique in the present embodiment is based on a vector quantization (VQ).

Figure 5:
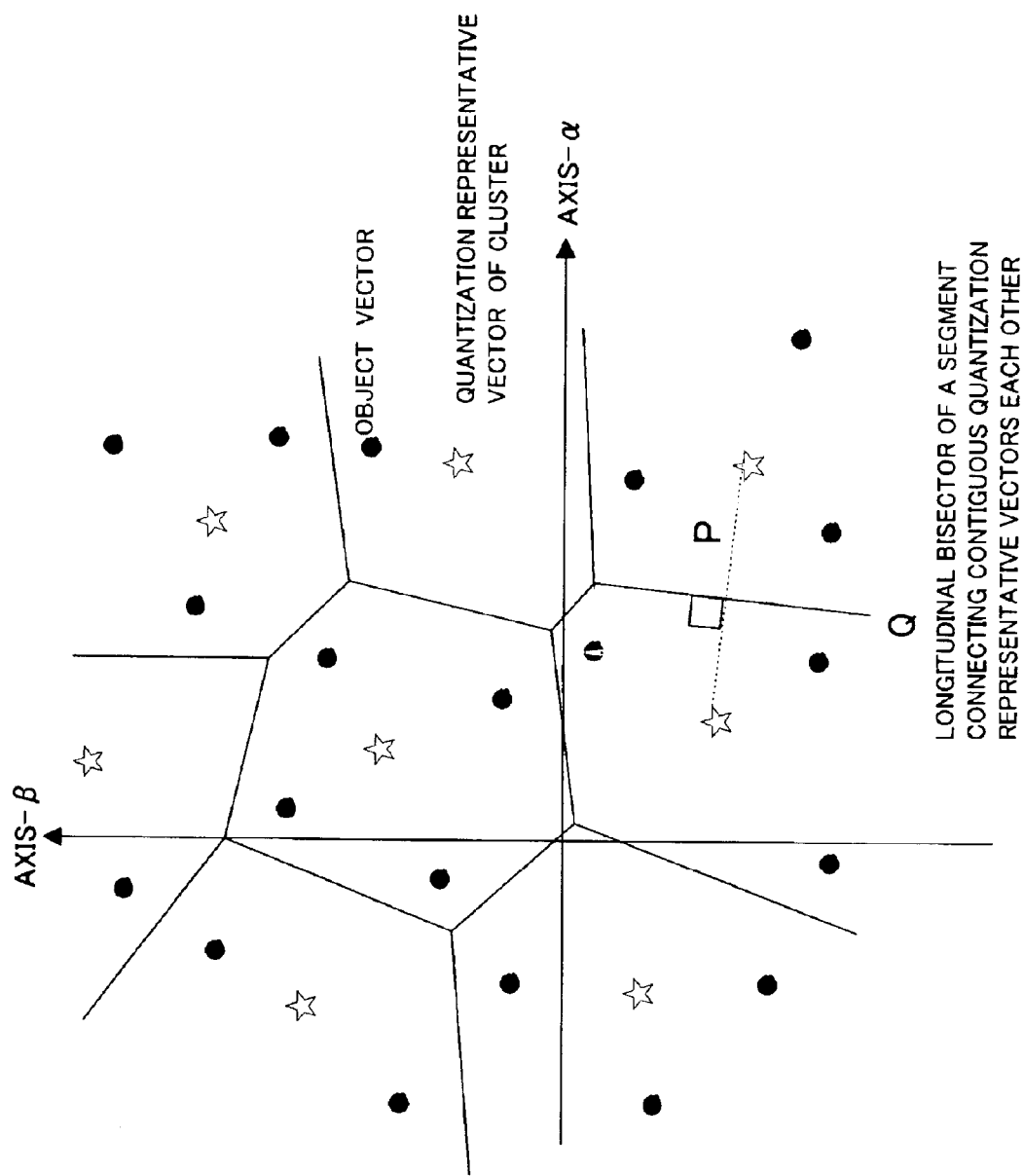
FIG. 5 is an illustration of clustering.

The vector quantization technique is a technique involving dividing a space of vectors—objects to be processed—having a plurality of factors (hereinafter referred to as object vector) into a plurality of clusters based on how a group of samples are distributed. And FIG. 5 shows how a VQ clusters a group of object vectors (indicated in black dots in the drawing) which are formed of two axis factors—α axis and β axis (In this case, the number of the above-mentioned factors is two). Quantization representative vectors (indicated by star-shaped marks in the drawing) are vectors to indicate the representatives of the respective clusters when an object vector space is divided into a plurality of clusters. There are many ways to carry out this VQ. What is shown in the technique in FIG. 5 is called k-mean technique, in which the cluster region frame is formed with perpendicular bisector Q of line segment P linking the neighboring quantization representative vectors. Representative data obtained by representative color deciding means 23 just correspond to quantization representative vectors in FIG. 5. It is noted that the object vector mentioned above is formed of two factors α and β. In the present invention, the vector is a color data vector (hereinafter referred to as color vector) having three factors, that is, three color data R, G, B each pixel has, and the representative color data obtained is also a vector (hereinafter, referred to as "representative color vector.")

First, assuming that the color vectors $v\_k=(rk, gk, bk)$ $(k=1, \ldots, K)$ of all the pixels within the object image block all belong to one cluster, initializing means 30 sets up a barycentric vector of color vector $v\_k$ for all the pixels for one representative color vector $c\_1=(rc1, gc1, bc1)$. Here, K represents the number of pixels within the object image block, rk indicates red data of pixel k, gk indicates green data of pixel k, bk indicates blue data of pixel k, rc1 indicates red data of representative color vector $c\_1$, and gc1 indicates green data, and bc1 indicates blue data.

Next, division axis deciding means 31 decides on the directions in which n pieces of clusters at the present moment (at first, n=1) are each divided into two pieces. First, division axis deciding means 31 calculates the difference absolute values (|ruk−rcj |, |guk−gcj |, |buk−bcj |) of the respective factors constituting representative color vector c_j (at first, barycenter of 1 cluster) and n_j pieces of color vectors u_jk=(ruk, guk, buk) (k=1, ..., n_j) that are classified into cluster j.

And on n_j color vectors, division axis deciding means 31 then works out their sum (rt_j=Σ|ruk−rcj |, gt_j=Σ|guk−gcj |, bt_j=Σ|buk−bcj |). Then, it can be considered that clustering can be done with precision by dividing the present clusters j into two in the direction of the axis of the largest value (r, g, b) among rt_j, gt_j, bt_j. This clustering is carried out on all n pieces of the clusters at the present moment.

Cluster dividing means 32 sets up two tentative representative color vectors dc_j and dc_j+1 in the direction of the axis obtained by division axis deciding means 31 with the representative color vector c_j of the cluster j at the present moment as center. If it is decided by division axis deciding means 31 that cluster j will be divided in the direction of r axis, for example, cluster dividing means 32 sets up tentative representative color vectors dc_j=(rcj−gamma×rt_j, gcj, bcj) and dc_j+1=(rcj+gamma×rt_j, gcj, bcj) using a predefined infinitesimal positive constant gamma.

Here, the infinitesimal positive constant gamma can be any number, but is decided on the basis of the variance dis_r_j=rt/n_j of difference between the r component rcj of representative color vector c_j at the division axis r and the r component ruk of color vectors u_jk classified into cluster j, for example (1/α;α of variance dis_r_j; a positive value not smaller than 1).

Figure 16:
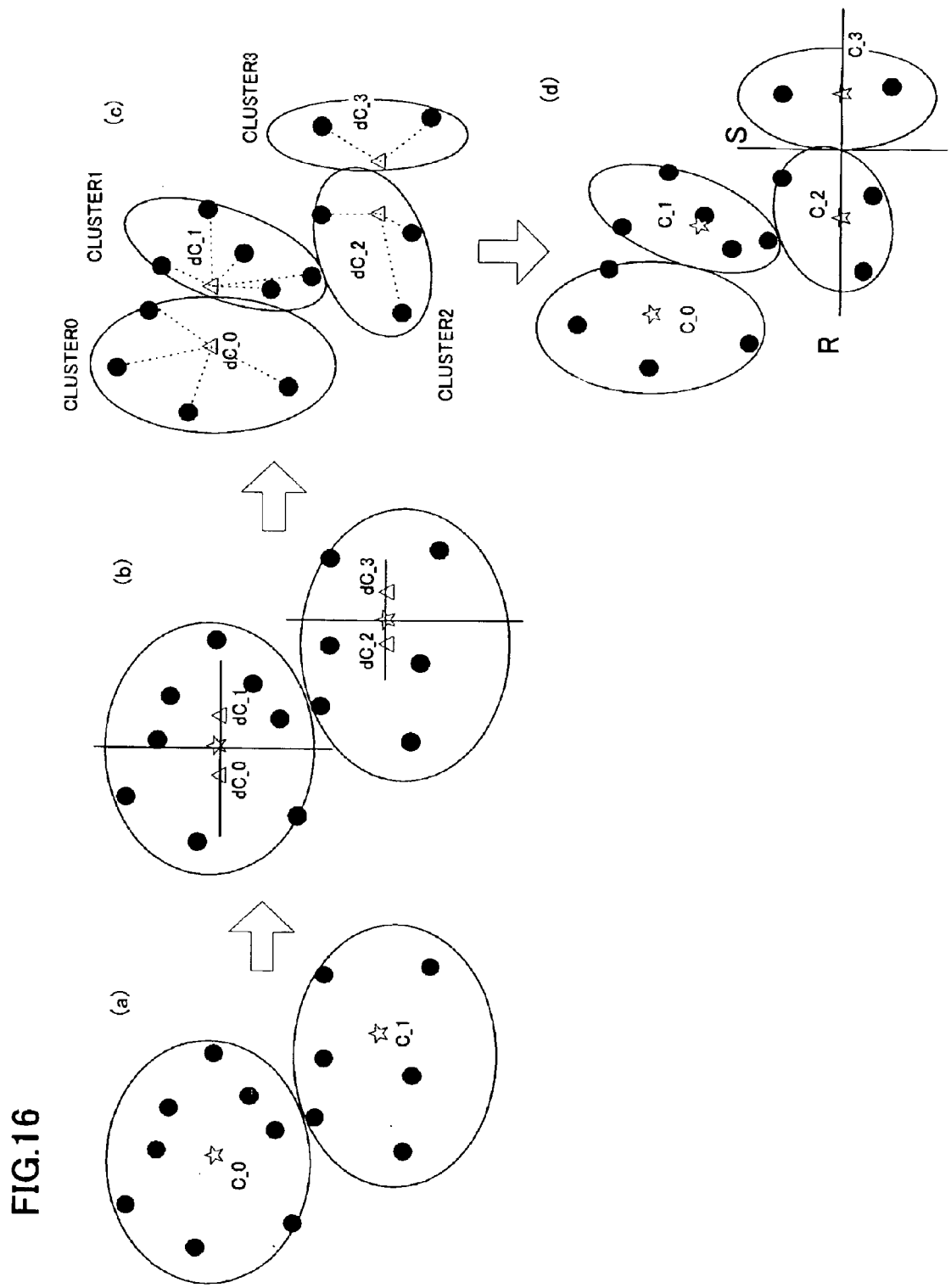
FIG. 16 is an illustration of clustering.

As shown, two tentative representative color vectors dc_j and dc_j+1 are generated from one representative color vector c_j. Processing by division axis deciding means 31 and cluster dividing means 32 is performed on all the clusters numbering n at the present moment, and therefore the number of clusters to be generated is 2n. This is not the only way of deciding on the tentative color vectors. Other methods may be used. FIGS. 16(a) and (b) schematically show processing by division axis deciding means 31 and cluster dividing means 32 when n=2. As shown in FIGS. 16(a) and (b), tentative representative color vectors dc_0 and dc_1 are generated from representative color vector c_0 representing cluster 0, while tentative representative color vectors dc_2 and dc_3 are generated from representative color vector c_1 representing cluster 1.

Next, cluster representative deciding means 33 classifies into clusters all the color vectors v_k (k=1, ..., K), or objects to be processed within the blocks, using 2n pieces of tentative representative color vectors dc_i (i=1, ..., 2n) newly generated by cluster dividing means 32. To be concrete, cluster representative deciding means 33 measures Euclidean distance disk_k_i between 2n pieces of tentative representative color vectors dc_i (i=1, ..., 2n) and a specific object color vectors v_k to be processed (hereinafter referred to as object color vector). Then, the cluster representative means 33 figures out a tentative representative color vector dc_i whose Euclidean distance disk_ki (i=1, ..., 2n) from the object color vector v_k is the shortest, and classifies the object color vector v_k into the cluster i=i_min, which corresponds to the thus-selected tentative representative color vector dc_i (FIG. 16(c)). And when classification process of all the object vectors within the blocks is completed, the barycenter of object of cluster i is set up again as representative color vector c_i of the cluster i. FIGS. 16(c) and (d) show the processing by cluster representative deciding means 33 when n=2. Here, perpendicular bisector S of line segment R linking two neighboring color vectors c_2 and c_3 is a border between these two clusters.

Figure 17:
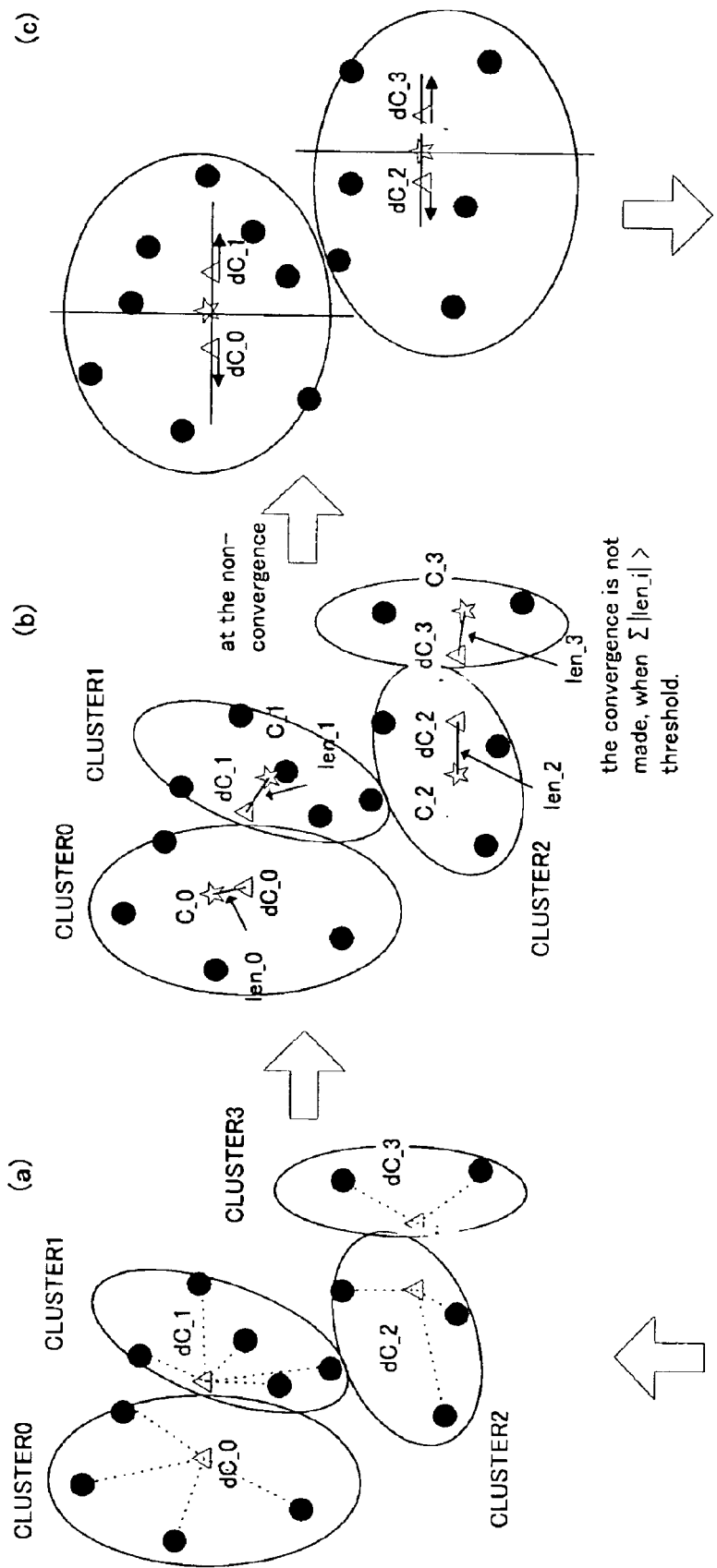
FIG. 17 is a continuation of FIG. 16.

Convergence judging means 34 judges whether representative color vectors obtained by cluster dividing means 32 and cluster representative deciding means 33 are converged. If the judgement criteria are not satisfied, then it is judged that 2n pieces of representative color vectors are not converged, and the processing to converge the representative color vectors will be repeated. A number of criteria for the judgement are conceivable. In the following, the method shown in FIG. 17 is explained. Whether 2n pieces of representative color vectors c_j are converged is judged by the Euclidean distance between tentative representative color vector dc_j obtained by cluster dividing means 32 and representative color vector c_j obtained by cluster representative deciding means 33 on the basis of that as shown in FIG. 17(b). In other words, Euclidean distance len_j=∥c_j−dc_j∥ between representative color vector c_j of cluster j and the corresponding tentative representative color vector dc_j is calculated. If the sum tlen=Σ∥c_j−dc_j∥ is smaller than a specific threshold, it is judged that 2n pieces of representative color vectors are converged. It is to be understood that ∥aa∥ assumes the norm of vector aa.

If convergence judging means 34 judges that the representative color vectors are not converged, the process proceeds to cluster dividing means 32, and two tentative representative color vectors dc_j and dc_j+1 are re-set up in the direction of the axis obtained by division axis deciding means 31 with n pieces of representative color vectors c_j—at the moment when the division axis is decided—as center. Cluster dividing means 32 re-sets up the tentative representative color vectors at points farther away from the center, that is, the representative color vector c_j than the previous tentative representative color vector as shown in FIG. 17(c). A re-setting example is tentative representative color vector dc_j=(rcj−2×gamma×rt_j, gcj, bcj), dc_j+1=(rcj+2×gamma×rt_j, gcj, bcj). And on the basis of the 2n pieces of tentative representative color vectors, cluster representative deciding means 33 again classifies all object color vectors within all the object vectors v_k. At the same time, representative color vectors within the respective clusters are obtained again. And convergence is checked again by convergence judging means 34 and if it is judged again that 2n pieces of representative color vectors are not converged, the process returns to cluster dividing means 32 again. Two tentative representative color vectors dc_j and dc_j+1 are again set up in the direction obtained by division axis deciding means 31 with n pieces of representative color vectors—at the moment when the division axis is decided on—as center in such a way that d_j=(rcj−3×gamma×rt_j, gcj, bcj), and dc_j+1=(rcj+3×gamma×rt_j, gcj, bcj).

In the KK-th setting, in case the dividing axis is in r direction, tentative representative color vectors dc_j and dc_j+1 from representative color vector c_j at the moment of deciding on the dividing axis are such that dc_j=(rcj−KK×gamma×rt_j, gcj, bcj) and dc_j+1=(rcj +KK×gamma× rt_j, gcj, bcj).

In the KK-th setting, it is also possible to set representative color vector dc_j and dc_j+1 from representative color vector c_j at the moment of deciding on the dividing axis such that with LL=Σ(1/KK), dc_j=(rcj−LL×gamma×rt_j, gcj, bcj) and dc_j+1=(rcj+LL×gamma×rt_j, gcj, bcj). That way, extracting representative color vectors can be kept from deteriorating in precision when variance rt-j in the dividing direction is very large. As alternative to using infinitesimal positive constant gamma as constant, an initial value of the infinitesimal positive constant gamma may be set and the infinitesimal positive constant may be so set as to be decreased depending on number KK of tentative representative color vector-settings.

In case the convergence judging means 34 finds that representative color vectors are converged, cluster division end judging means 35 judges whether the number of clusters (number of representative color vectors) satisfies or reaches a specific number m of cluster divisions. If the number m is reached, representative information outputting means 36 outputs the representative color vector representing the cluster finally obtained as identification information (FIG. 4(b)), that is, representative color vector and cluster number to which the respective pixels within the image block belong. If the specific cluster division number m is not reached, the process is brought back to division axis deciding means 31.

In this embodiment, it is so arranged that the number of clusters finally obtained is a multiple of 2. It is also possible to end the processing by division axis deciding means 31 and cluster dividing means 32 and proceed to cluster representative deciding means 33 when any desired number of clusters is reached in the stage where division axis deciding means 31 and cluster dividing means 32 divide clusters into two each.

Figure 18:
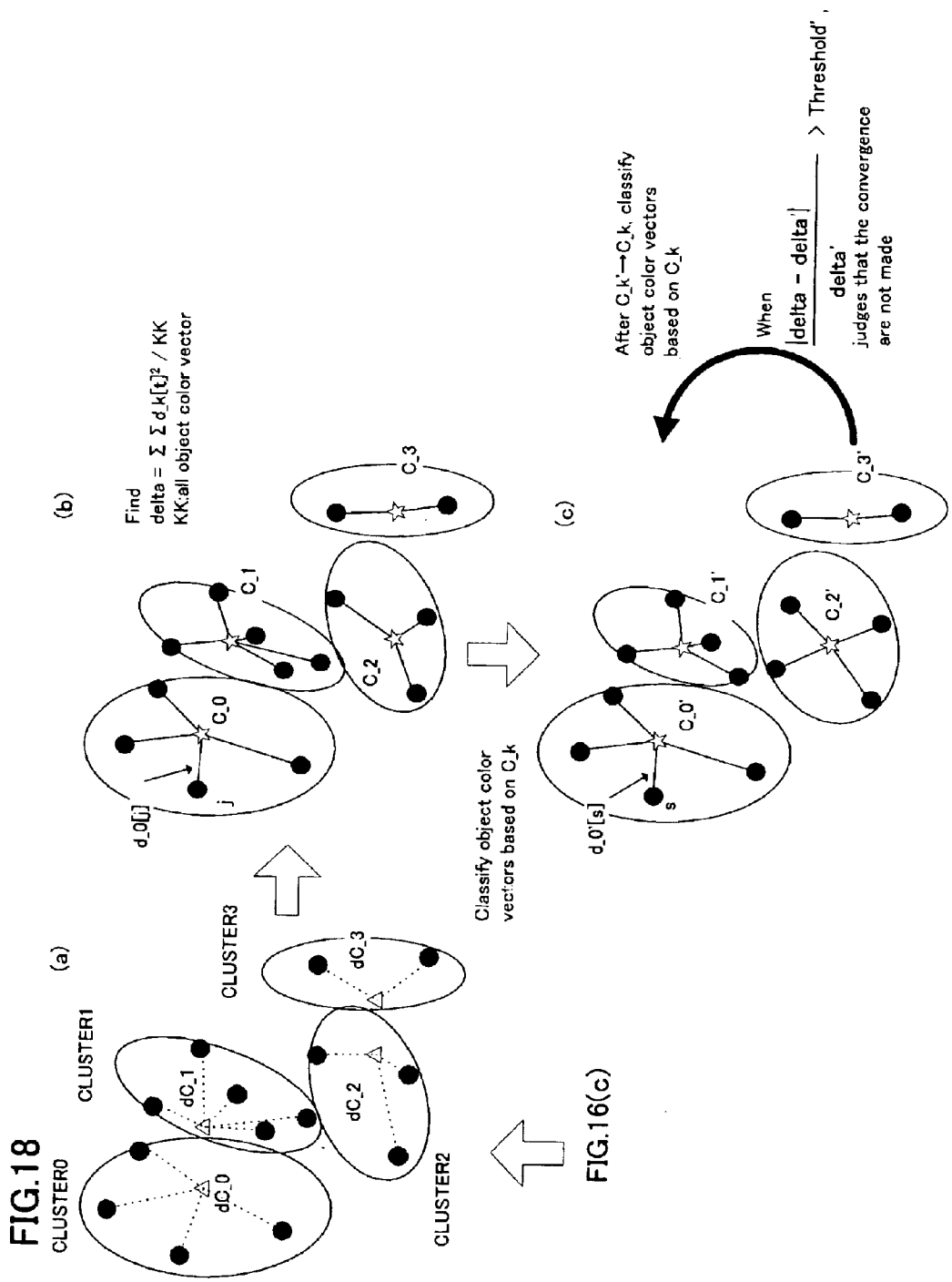
FIG. 18 is an illustration of another clustering.
Figure 19:
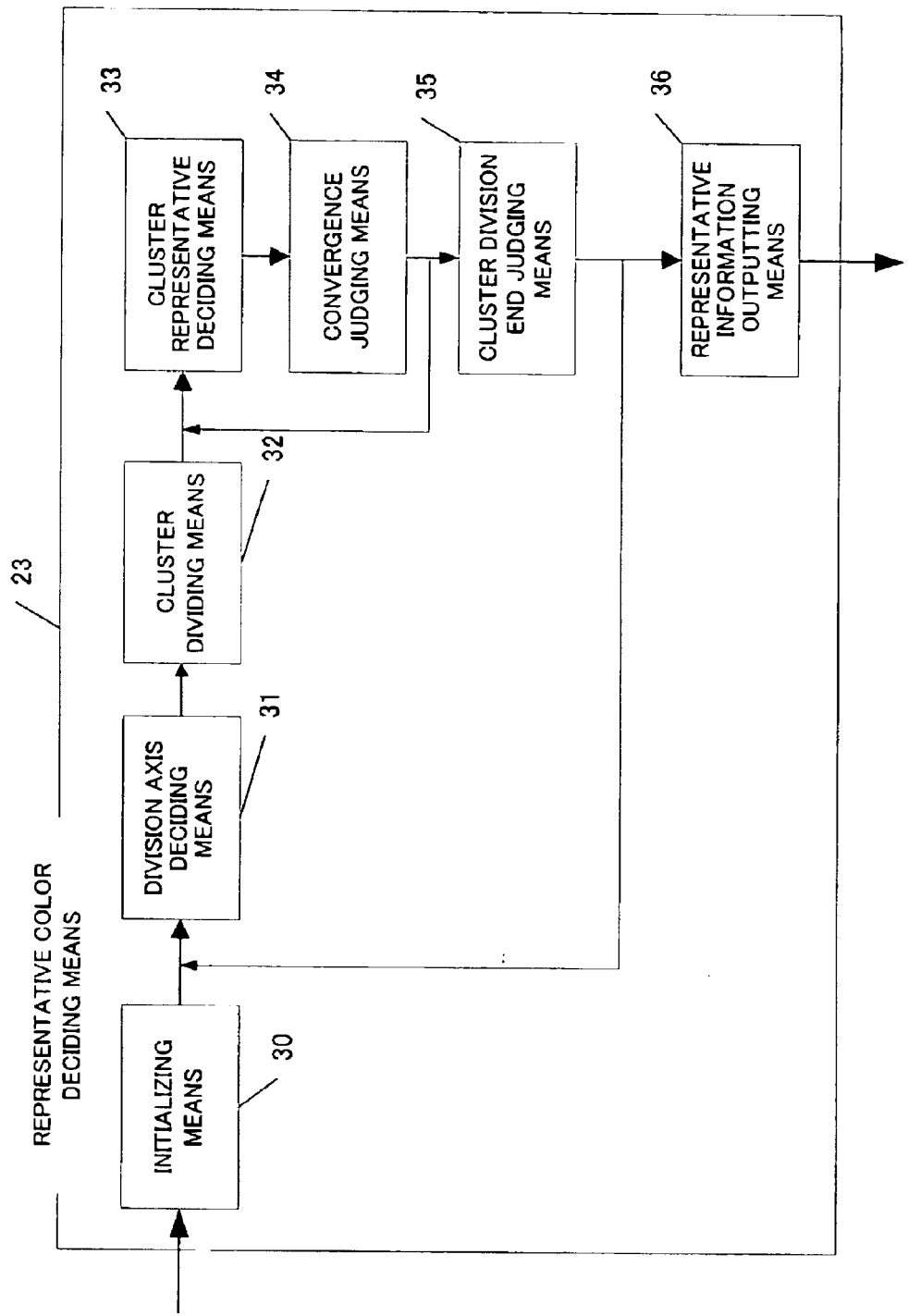
FIG. 19 is a block diagram of another example of representative color deciding means.
Figure 20:
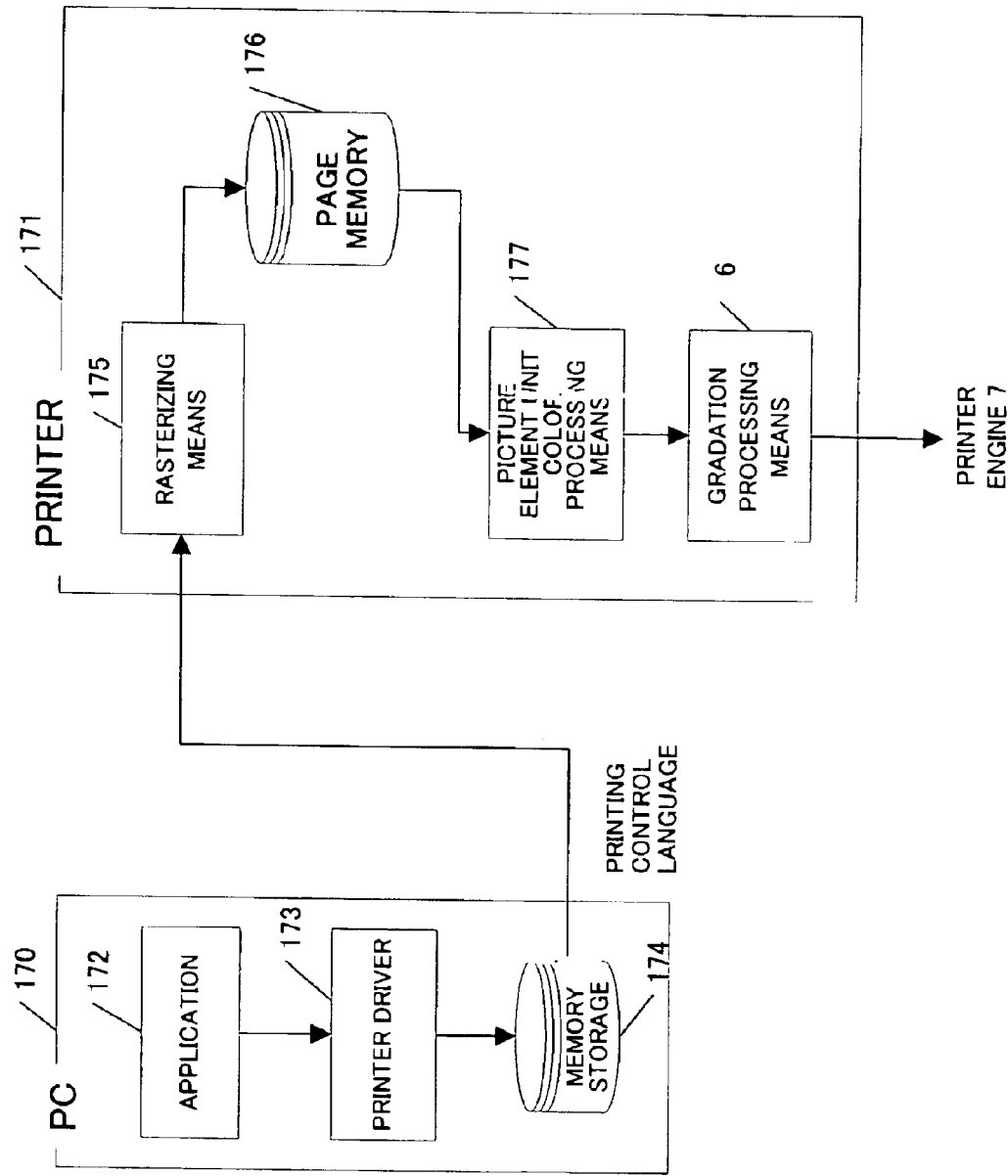
FIG. 20 is a block diagram showing the arrangement of the prior art image processing apparatus.

A convergence judgement method as shown in a block diagram in FIG. 19 and schematically shown in FIG. 18 is also possible. This method 20 finds the Euclidean distance $d\_j[k]$ between 2n pieces of new representative color vector $c\_j$ barycentric color vectors of cluster j as mentioned above—obtained by cluster representative deciding means 33 and object color vectors $u\_k$ classified into cluster j corresponding to the representative color vectors. And the mean value delta=$\Sigma\Sigma d\_j[k]^2$/KK for KK pieces of object vectors within the block of that square value is found. Then using the latest representative color vector $c\_j$ (j=1, . . . , 2n) obtained by cluster representative deciding means 33, all the object color vectors are classified in clusters again (the shortest of the 2n pieces of Euclidean distance disk$\_k\_i$ between the object color vector and representative color vectors is selected and the object vector $v\_k$ is then classified into that cluster j=j$\_$min corresponding to the representative color vector), and the representative color vector $c\_j'$ of each cluster is worked out. Similarly, the Euclidean distance $d\_j'[k]$ between this representative color vector $c\_j'$ and the object vectors $u\_k'$ classified into the corresponding cluster j' is found, and its mean square value delta' is worked out. If the ratio to delta' of displacement quantity between that delta and delta' is smaller than a specific threshold, that is, |delta−delta'|/delta'<threshold', it is judged that 2n pieces of representative color vectors at the present moment are converged. Clusters can be divided and representative color vectors can be extracted more precisely on the basis of the variation in mean distance between the object color vectors and the representative colors thus obtained rather than judging on the basis of the distance error between the tentatively set representative color vector and its representative color vector. Furthermore, an advantage is offered that it eliminates the necessity of cluster dividing means 32 always setting tentative representative color vectors.

As set forth above, representative color deciding means 23 divides into a plurality of clusters the object color vector constituted of 3 color data of the pixels within the object image block on the basis of the distribution using VQ. But this is not the only way. It is also possible to make a division simply starting with the maximum value or the minimum value of each color instead of VQ so that the histograms within the respective clusters are identical. But the present embodiment uses the VQ technique which permits precise cluster division according to a statistical distribution of cluster inputted data. As to clustering other than that, it is also possible to use a technique represented by self-organizing neural network (T. Kohonen; Self-Organization and Associative Memory, Springer Verlag), for example.

Also, in the present embodiment, division axis deciding means 31 and cluster representative deciding means 33 set a barycentric vector of object color vectors $v\_k$ belonging to the respective clusters as representative color vectors representing the respective clusters. It is also possible to make a cluster division by the object color vectors belonging to the respective clusters themselves selecting the optimum one. In the present embodiment, it is also so arranged that when cluster representative deciding means 33 classifies object color vectors $v\_k$ in the respective clusters, object color vector $v\_k$ should belong to cluster i where Euclidean distance disk$\_ki$ between representative color vector $c\_i$ at the present moment and object color vector $v\_k$ is the shortest. Instead of the Euclidean distance, it is possible to use the sum of absolute value of difference between the respective factors of representative color vector $c\_i$ and object color vector $v\_k$ or the like.

Figure 6:
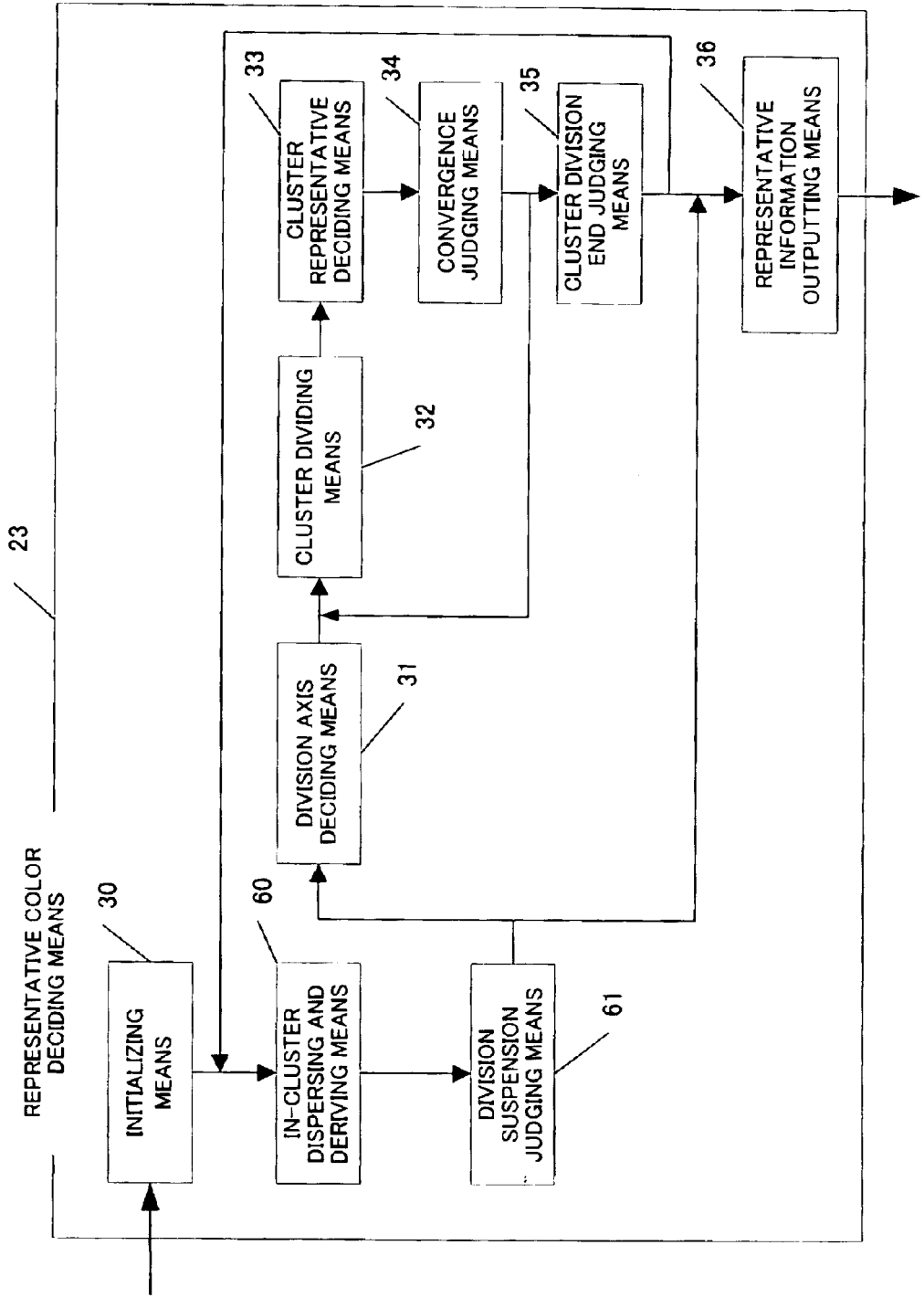
FIG. 6 is a block diagram showing an arrangement of representative color deciding means.
Figure 7:
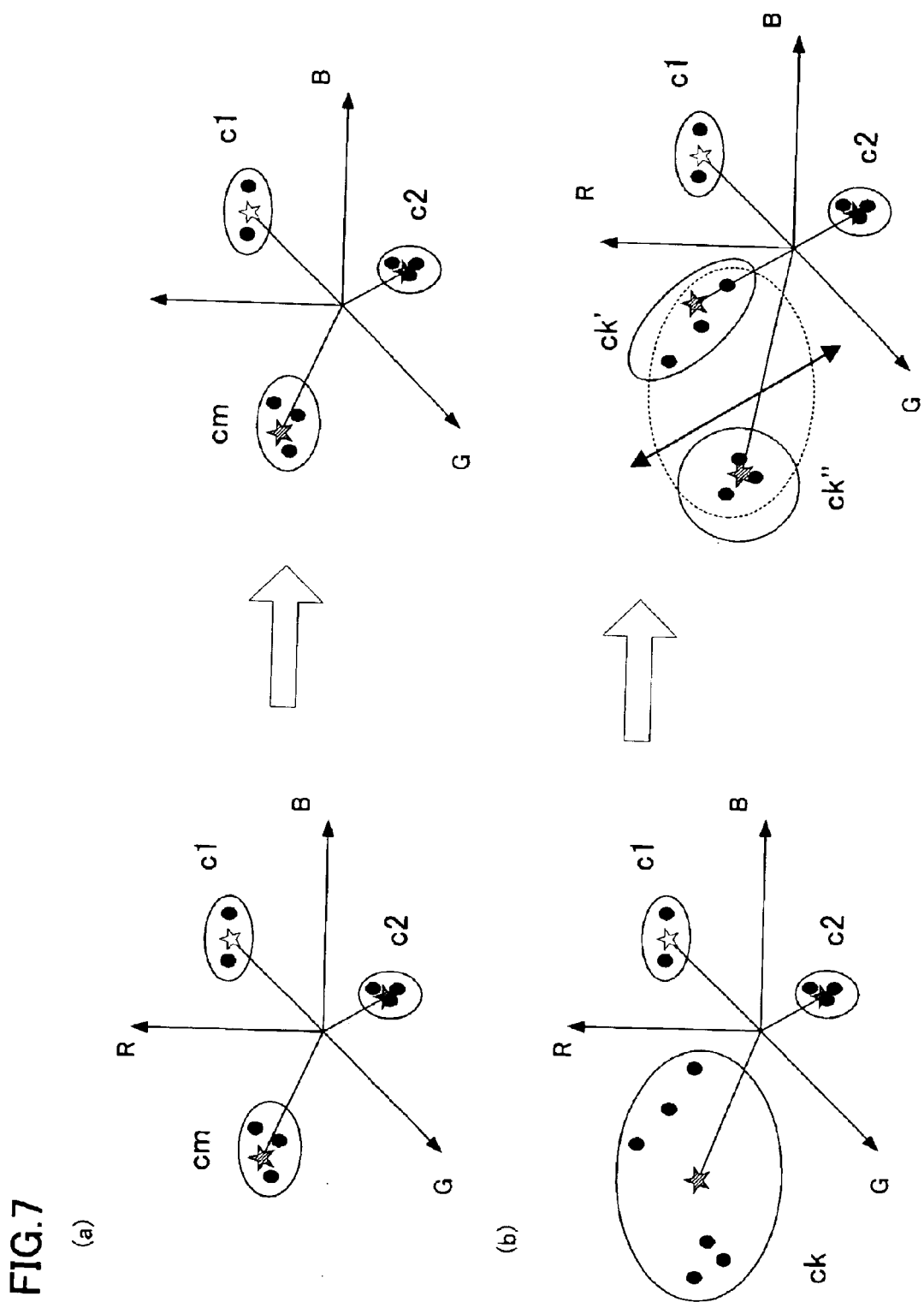
FIG. 7 is an illustration of clustering.

In the arrangement of representative color deciding means 23 as shown in FIG. 6, furthermore, it may be so arranged that before division axis deciding means 31 decides on the cluster division axis, in-cluster variance deriving means 60 does processing to find the variance cdelte[i]' of Euclidean distance disk$\_ki$ between representative color vector $c\_i$ (i=1, . . . , p) within each cluster of p pieces of clusters at that moment and n$\_i$ pieces of object color vectors $u\_k$ (k=1, . . . , n−i) belonging to cluster i. And division suspension judging means 61 finds the maximum value max $\_$cdelta of its variance cdelte [i] (i=1, . . . , p) and judges whether the value is larger than the pre-set cluster suspension standard value. If the value is smaller, it is judged that the distance between the representative color vector and the belonging object color vector is small in all p pieces of clusters at the present moment and the cluster division is ended. And representative information outputting means 36 outputs p pieces of representative color vectors and identification information on the pixels within its divided block. If the value is larger, on the other hand, cluster division continues to be carried out by a clustering technique like VQ in the same way as in representative color deciding means 23 in the first embodiment of the present invention. This process is schematically shown in FIG. 7. In FIG. 7(a), if object vectors (black dots) in the respective clusters c1, c2, cm gather within an area with variances of the distance from the representative color vectors (star marks) smaller than the above-mentioned standard value, division is ended in these clusters. In cluster ck in FIG. 7(b), on the other hand, if object vectors gather within an area with variances of the distance from the representative color vectors (star marks) larger than the above-mentioned standard value, cluster ck is further divided by line S into cluster ck' and cluster ck". In other words, the feature of the process lies in judging whether the cluster division is to be continued on the basis of the distance between the representative color vector within a divided cluster and the belonging object color vectors. That avoids unnecessary setting up of a representative color in a region where there are little changes in color, reducing the volume of data to be held in the work memory.

Furthermore, in case the color data within all the divided blocks in the object image is approximated with a specific cluster division number and if the cluster division number is too small, approximate errors will occur in the restored image because of shortage in the number of approximate representative color vectors in regions having areas where there are much color data or violent changes. But if the cluster division number, which is used for ending judgement by cluster division end judging means 35, is set at a high level and if the number of color data to approximate within the block is changed appropriately, approximate errors in the restored image can be reduced.

It is noted that the process used here to change the number of representative colors to approximate according to statistical distribution of color data with respective divided areas is not the only way. Also possible is a technique of dividing blocks in such a way that the belonging object vectors are identical in number instead of using variance of the Euclidean distance between representative color vectors. It is also possible to adjust the number of object color vectors or the number of belonging representative color vectors representing the respective blocks on the basis of the Euclidean distance between representative color vectors.

As set forth above, according to the present embodiment, it is first judged whether the object image is graphics or text data that can be described by the drawing command or natural image data like photos that can be treated by pixels, bit map for example alone, and then each color-processing can be performed at a high speed. And for graphics and text data, color palette information expressing their color information is extracted. Then, color-processing is performed on each color palette, thus reducing the number of color-processings. As to photo images, the object image is divided in areas of a specific size, and the color data distribution of pixels therein are approximated with a plurality of representative colors, thus reducing the number of colors required to express the specific area. Performing color-processing on the representative colors only can substantially reduce the number of color-processings.

In either photo images or command images, it is also noted, color-processing is not performed by pixels on all the pixels within the image, and therefore a high-speed image outputting can be realized.

Furthermore, instead of compacting the number of colors on all the image blocks as described above, the compacting can be carried out block by block by image dividing means 22. In other words, on the respective image blocks obtained by image dividing means 22, a series of steps are carried out: decision of representative colors by representative color deciding means 23→color-processing by representative color processing means 13→restoration of bit map image by image restoring means 14. After the series of processings on one image block are completed, the same process can be performed on the next image block. According to this method, it is not necessary to generate representative color vector information on all the image blocks and hold it in the work memory. What is needed is to generate representative color vector information on only one image block each time. This offers advantages especially when a large image size is divided into very small blocks. The advantages are easy writing and reading (data processing) in work memory etc. in circuit designing on hardware and further increased speed of processing.

Embodiment 2

Figure 8:
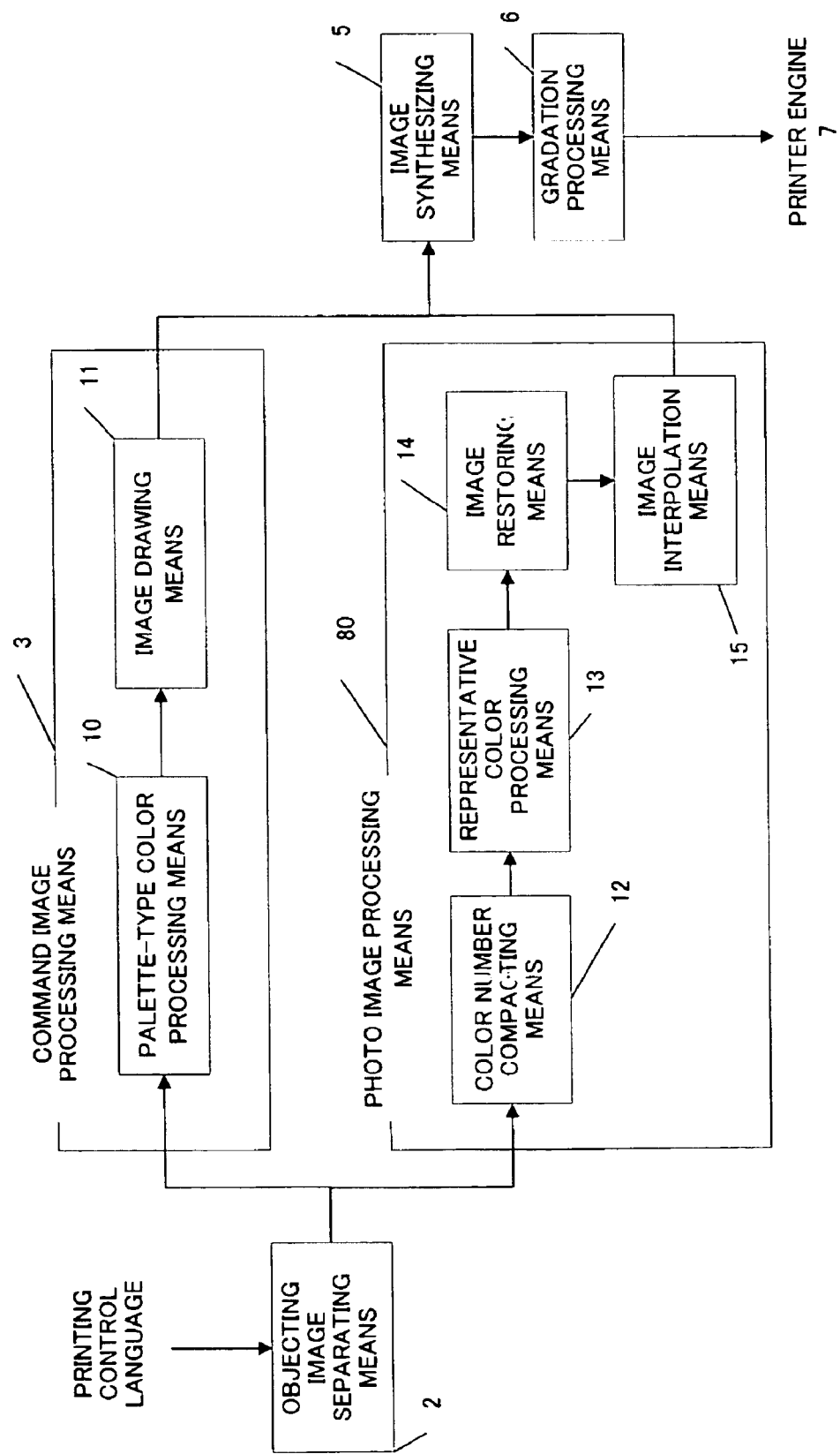
FIG. 8 is a block diagram showing the arrangement of the image processing apparatus of a second embodiment according to the present invention.

FIG. 8 shows a block diagram of the image processing apparatus according to the second embodiment of the present invention.

The process up to the steps of object image separating means 2 separating color images described in printing control language 1 into command images and photo images, followed by color processing to generate a bit map image is identical with that in the first embodiment and will not be explained again.

In the present embodiment, image interpolation means 15 performs interpolation on the bit map image generated by image restoring means 14 of photo image processing means 80.

In the image processing apparatus of the first embodiment, the number of colors within the blocks are reduced by representative color vectors, and because of this, the edge portions tend to be notched. Furthermore, it is impossible to express a gradation in an area where colors gradually change as in a gradation, and color expression can be flat. The object of the present embodiment is to solve such problems in the first embodiment.

Figure 9:
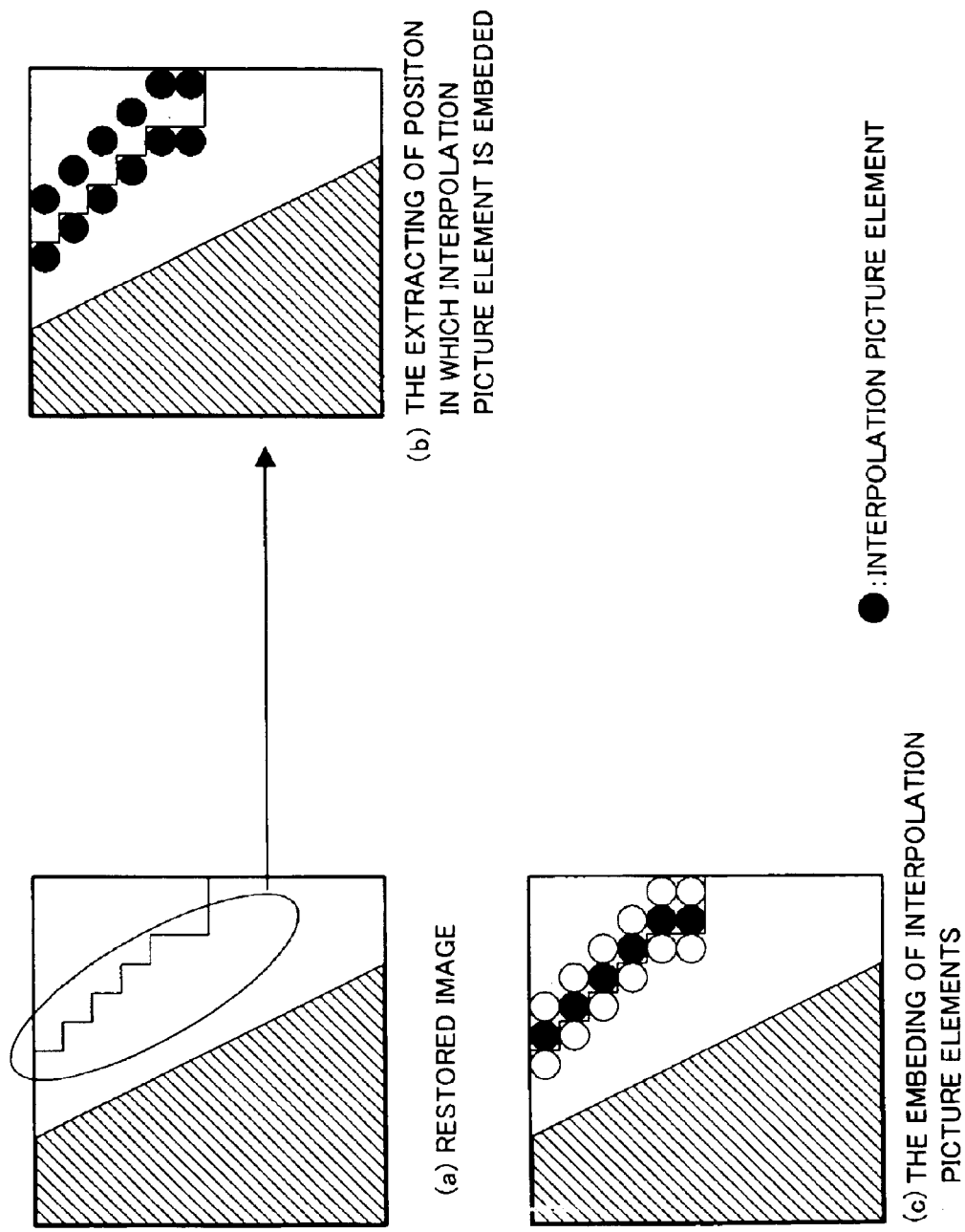
FIG. 9 is an illustration of image interpolation.

The outline of this interpolation is illustrated in FIG. 9. If, for example, an edge portion is notched as in FIG. 9(*a*), image interpolation means 15 interpolates restored color data of surrounding pixels to reduce the notch. FIGS. 9(*b*) and (*c*) schematically show pixels (black dots in FIG. 9(*b*)) to interpolate the notch in FIG. 9(*a*) and their embedding positions (black spots in FIG. 9(*c*)). The edge portion is improved and made smooth by placing restored color data, mean value for example, of the pixels in the embedding positions for interpolation that surround the edge as in FIG. 9(*c*). The same interpolation is utilized to make up for flatness and lack of smoothness of restored colors in an area where colors change gradually as in a gradation. This is not the only interpolation method. There are a number of other methods. An example is a function approximation technique using a linear function etc. with more image data. In the present embodiment, it is also noted, the interpolation pixel embedding technique is used in areas where pixels violently change in density as in the edge of the restored image and in flat areas caused because of lack of colors in a gradation. Another method is conceivable. That is, it is possible to increase the number of color data to express through linear interpolation between a plurality of representative color vectors generated within the object divided block. This technique also can improve areas where pixels suddenly change in density as in an edge and color flatness in a graduation area caused by color compaction, and outputted images can be improved in quality.

Figure 10:
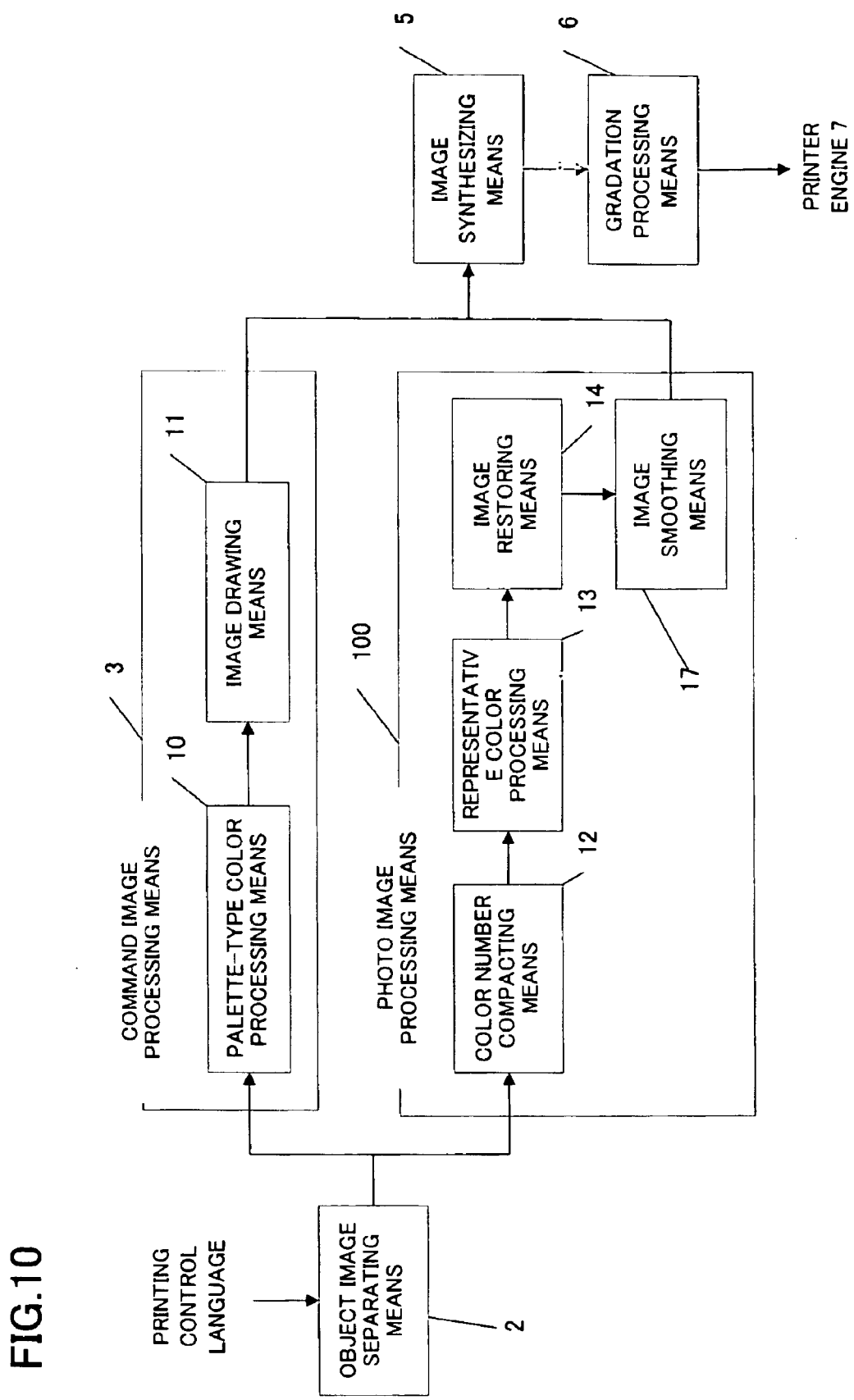
FIG. 10 is a block diagram showing an aspect of the arrangement of the image processing apparatus of the second embodiment according to the present invention.

Still another way is possible. That is, instead of image interpolation means 15 in FIG. 8, image smoothing means 17 as shown in FIG. 10 is provided to photo image processing means 100 for smoothing on bit map images generated by image restoring means 14.

Figure 11:
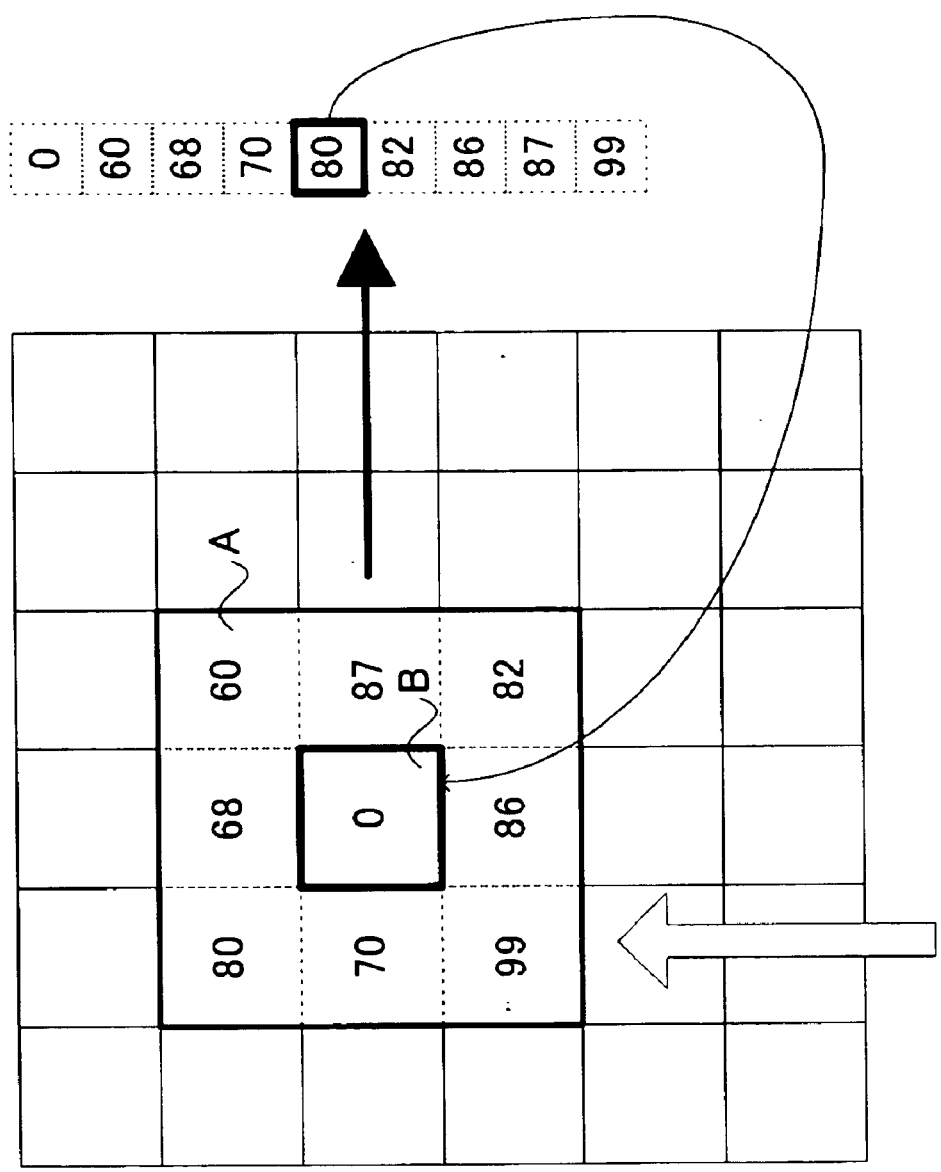
FIG. 11 is an illustration of smoothing.

This smoothing is outlined in FIG. 11. But here in the present embodiment, processing by the use of a median filter is applied to bit map images obtained by image restoring means 14. This median filter processing is to smooth a notch and noise caused by reduction of the number of colors as in the image interpolation technique. In the median filter, in case a filter of a size of 3×3 enclosed with frame line A as shown in FIG. 11 is used, for example, 9 pixel data are linearly arranged in the order of density, and the mean value of the density (in the example in FIG. 11, 80) is embedded in the center of the filter or the object pixels enclosed with frame line A. In handling a color image, by the way, image restoring means 14 can separately filter each component of the four-component data (CMYK) the color to be printed has. Also, the following method is conceivable. That is, of the four components, one component alone is filtered while the other color data are restored according to the ratio of the density after filtration to that before filtration.

Other than the median filtration, there are methods such as smoothing and median filtration on the average of pixels around the object pixel, the object picture and color data of the surrounding 8 pixels.

As set forth above, according to the present embodiment, notches near the edge of restored images caused by decreased number of colors to express in the respective blocks and unnaturalness in areas where colors change gradually as in a gradation can be improved by providing the first image processing apparatus and image processing method with image interpolation means. Thus, outputted images can be improved in quality.

Embodiment 3

Figure 12:
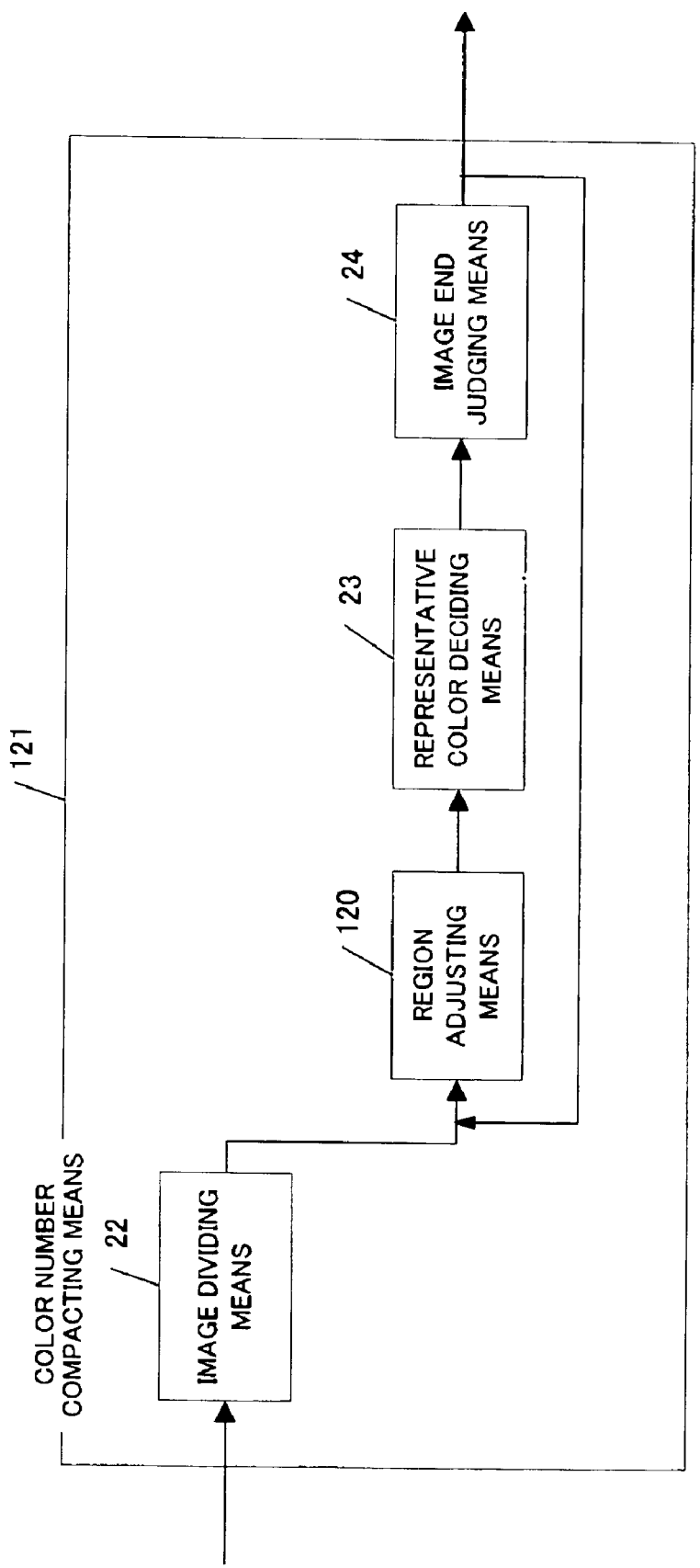
FIG. 12 is a block diagram showing the arrangement of the image processing apparatus of a third embodiment according to the present invention.
Figure 13:
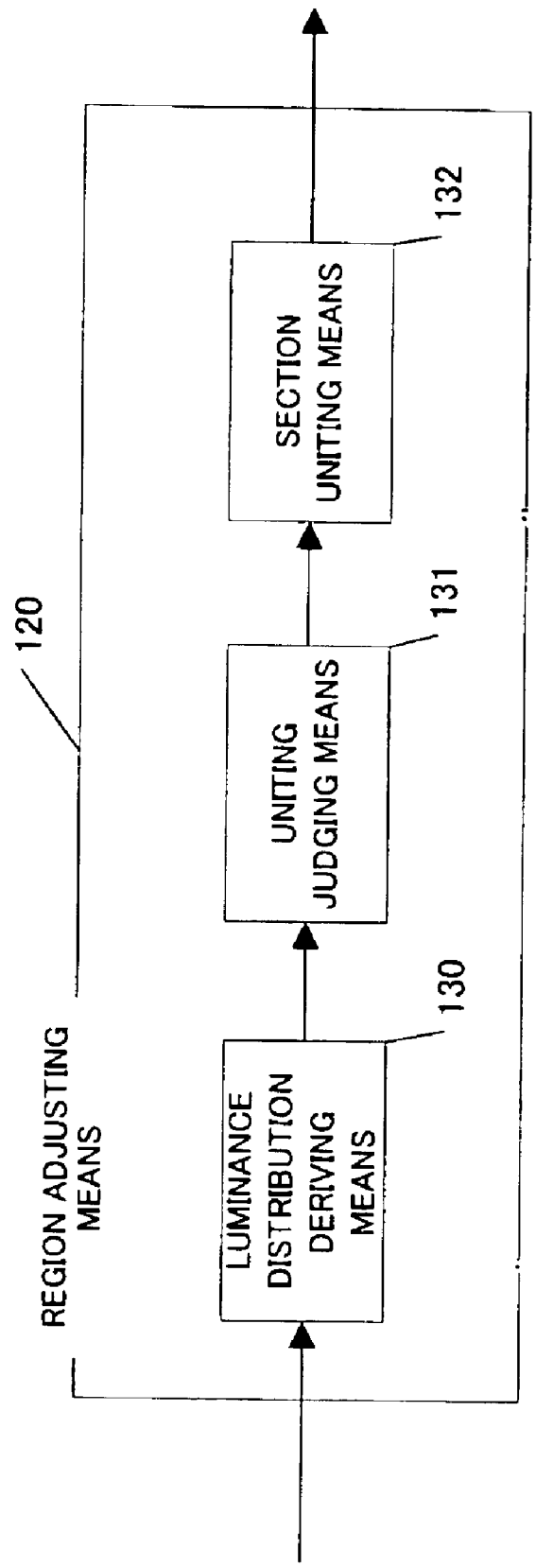
FIG. 13 is a block diagram showing an aspect of the arrangement of the image processing apparatus of the third embodiment according to the present invention.

Arrangements of the image processing apparatus according to the third embodiment are shown in FIGS. 1, 12 and 13.

The process up to the steps of object image separating means 2 separating color images described in printing control language 1 into command images and photo images, followed by color processing of the command image by command image processing means 3 is identical with that in the first embodiment and will not be explained again.

Color number compacting means 121 within photo image processing means 41 is provided with region adjusting means 120 as shown in FIG. 12. Other than that, the present embodiment is the same as the first embodiment. Furthermore, this region adjusting means 120 is constituted as in FIG. 13.

Figure 14:
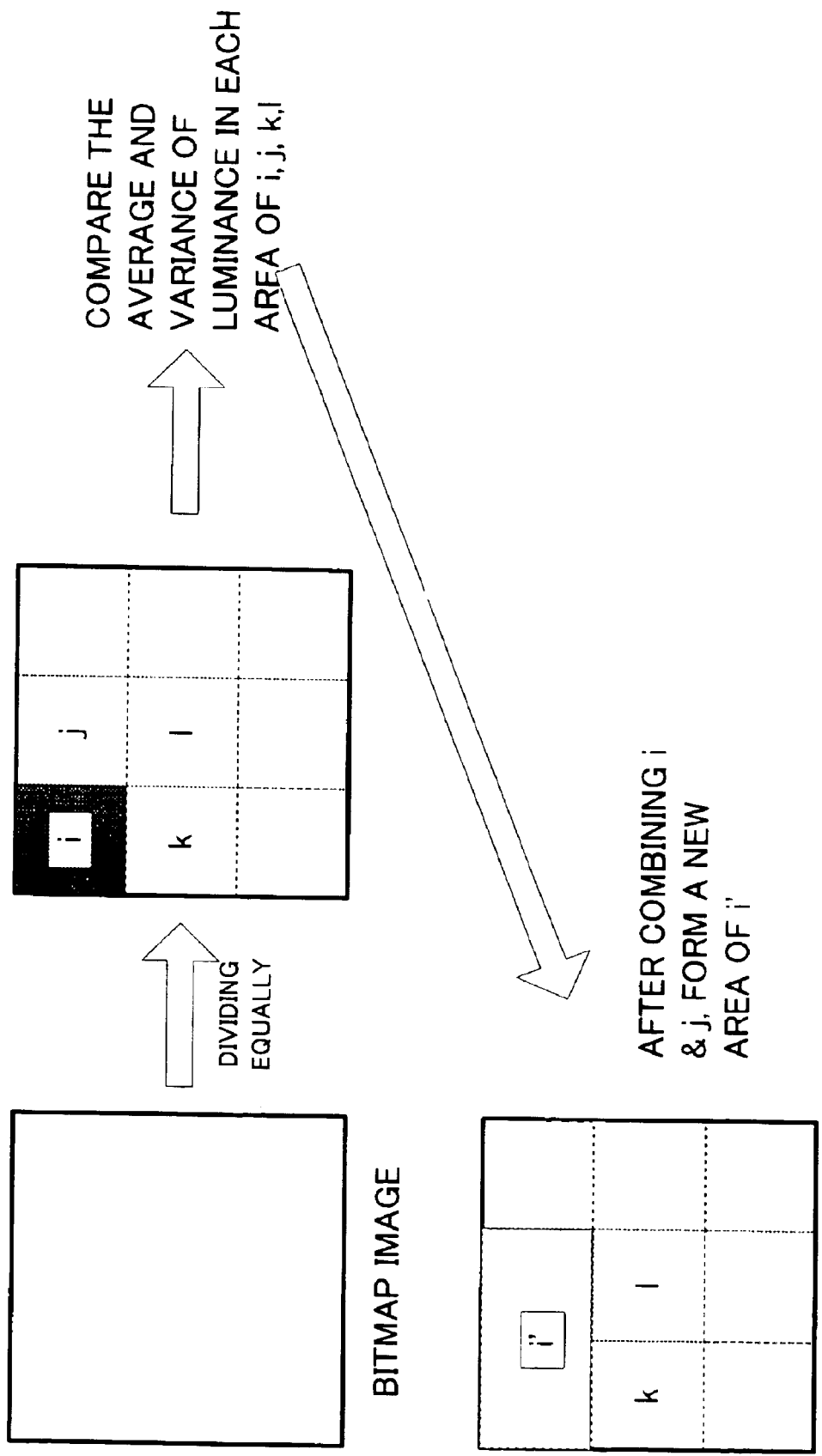
FIG. 14 is an illustration of uniting blocks.

The processing performed by this region adjusting means 120 will be explained with reference to FIG. 14.

Of the blocks generated by image dividing means 22, the image block to be processed here is indicated by block i. The neighboring block is indicated by block j. kido [i] indicates the mean luminance in block i and kido [j] indicates the mean luminance in block j. Delta [i] indicates variance of luminance in block i, and delta [j] indicates variance of luminance in block j. In region adjusting means 120, luminance distribution deriving means 130 first works out mean luminance kido [i] in block i and mean luminance kido [j] in block j. In uniting judging means 131, a comparison is made between the worked out mean luminance and luminance variance between block i and its neighboring block j. And it is judged whether the absolute values of those differences are larger than pre-set uniting judging standard values kth and dth. If the differences are smaller, that is |kido [i]–kido [j]|<kth, and |delta [i]–delta [j]|<dth, then block uniting means 132 unites block i and block j into one block i'.

This way, the block size is adjusted according to the luminance distribution within the image when the bit mage photo image is divided. That is the processing performed by region adjusting means 120. Even in a photo image, regions where changes are relatively small in color data are handled as one block, thereby reducing work memory etc. and processing time. The subsequent color-processing, restoration of bit map image etc. are identical with those in Embodiment 1 and Embodiment 2, and will not be explained again.

In the present embodiment, it is noted, uniting of blocks is done on the basis of the mean value and variance within the neighboring blocks. That is not the only basis that can be used. Other than that, the basis can be the mean value and variance of G signal alone that most contributes to luminance in the RGB system. Another way is possible: the RGB system is first converted into La*b* space or uniform color space, (Publication CIE No 15.2 (1986) Colorimetry second edition) and the mean value of lightness L and variance can be used as basis. Also, to consider not color data for judging but differential value is another technique to possible to use.

In addition, the region adjusting method is not limited to 1:1 block comparison and uniting. It is possible to compare the object block with the surrounding 8 blocks and unit them. It is also possible to decide block regions to divide one after another according to change in reference data such as luminance instead of dividing the image into blocks of a size in the initial stage.

Furthermore, combining the present embodiment with the first embodiment of the present invention can reduce the number of photo images to be processed to a minimum, thus saving the processing.

Embodiment 4

Figure 15:
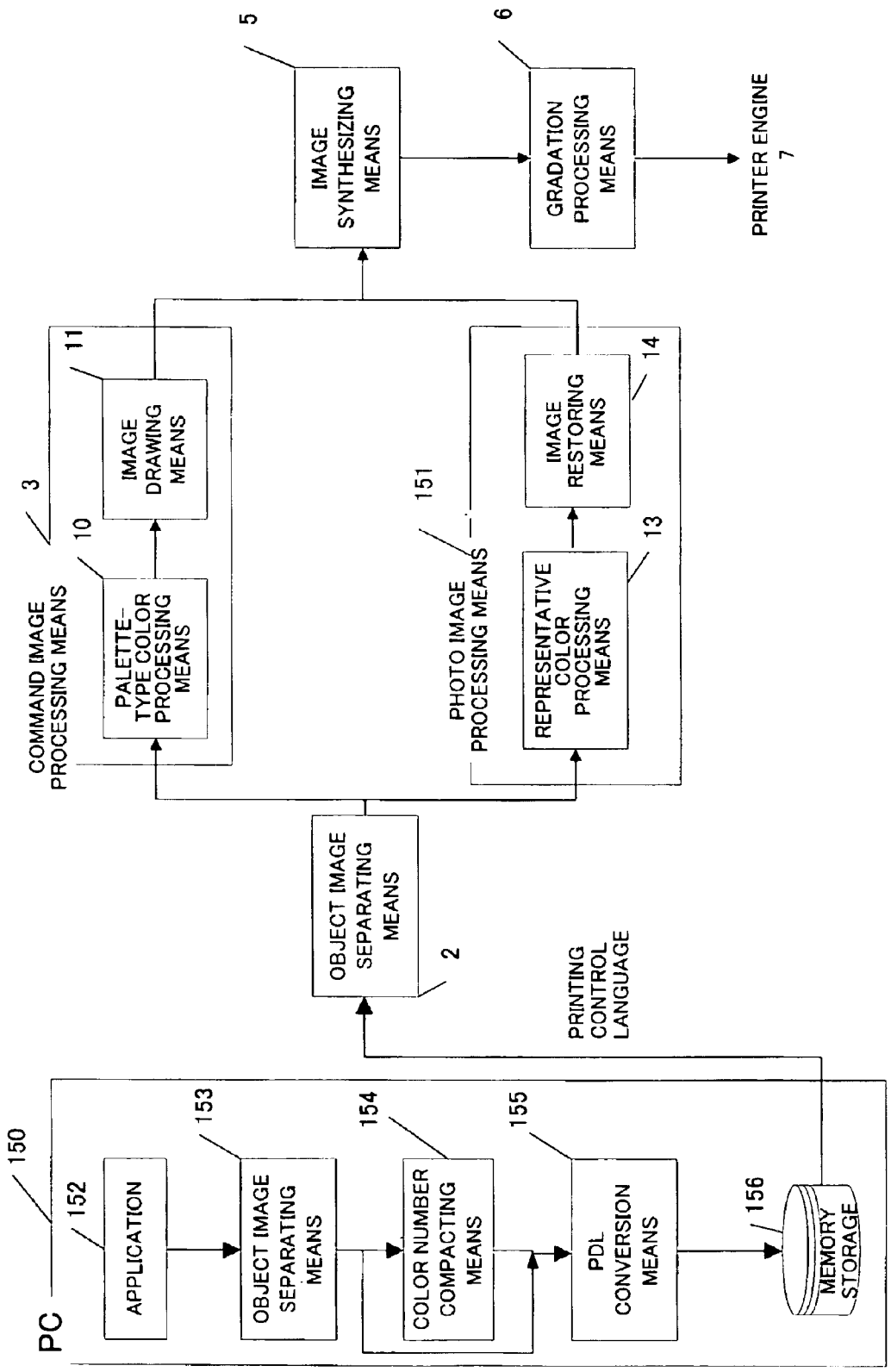
FIG. 15 is a block diagram showing an arrangement of the image processing apparatus of the fourth embodiment according to the present invention.

FIG. 15 shows arrangements of the image processing apparatus according to the fourth embodiment of the present invention.

In the present embodiment, it is so arranged that of the color images generated by application 152 within a computer 150, the photo image has representative colors decided on before being converted into printing control language 1.

First, the color image is separated into a command image and a photo image by object image separating means 153. The command image is converted into printing control language 1 by printing control language conversion means 155 and stored in the memory storage. The photo image has representative colors decided on by color number compacting means 154 and then converted into printing control language 1 by printing control language conversion means 155 and stored in memory storage 156.

The processing by the color number compacting means 154 is identical with that by color number compacting means 12 in the first embodiment except that the data to be handled is application data before being converted into printing control language 1, and will not be explained again.

The command image thus converted into printing control language 1 and the photo image of which the representative colors are decided on are separated by object image separating means 2 and then color-processed. That is, command image processing means 3 color-processes the command image. This processing is the same as that in the first embodiment of the present invention and will not be explained again. The photo image is color-processed by photo image processing means 151. But since representative colors have already been decided on for this photo image, it will be sufficient if representative color processing means 13 color-processes the representative colors and image restoring means 14 generates a bit map image. These processings are the same as those in the first embodiment and will not be explained again.

As set forth above, in the present embodiment, it is first judged whether the object image is graphics or text data that can be described in the drawing command or natural image data like photos that can be treated by pixel, bit map for example, only, and then each color-processing can be performed at a high speed. And for graphics and text data, color palette information expressing color information is extracted, and color-processing can be performed on its color palette, whereby the number of color-processings can be reduced. As to the photo image, the object image is divided into regions of a specific size. And the color data distribution of pixels therein is approximated with a plurality of representative colors, whereby the number of colors to express a specific region can be reduced. The number of color-processings can be substantially reduced by performing color-processing on the representative colors alone.

Finally, it should be parenthetically noted that the respective processings of the present invention just described can also be materialized in software processing using the central processing unit (CPU) used for computers, digital signal processor (DSP) etc.

The conversion of image data into a printing control language has been described. But if a display unit is used in place of the printer as output unit, image data has to be converted into a language for the display unit. Furthermore, on Windows, a program image interface for graphics called GDI serves as a language for printing and at the same time as a language for display. In case a printer or display unit which operates on Windows, therefore, image data has to be converted into a language acceptable for GDI.

Furthermore, although the above explanation was devoted to a bitmap image with one bit per pixel, an image with a plurality of bits per pixel is also applicable.

As set forth above, according to the present invention, even color images synthesized of a command image and a photo image can be color-processed at a high speed.

What is claimed is:

1. An image processing apparatus for converting color image data described in control language of an output unit to a color image adapted for said output unit, the image processing apparatus comprising:
   color number compacting means for compacting the color image data of a photo image by clustering pixels within a specific area according to the color information of each pixel and deciding at least one representative color of the clustered pixel group;
   representative color processing means for color-processing of the representative color; and
   image restoring means for converting said photo image to a pixel image on the basis of said color-processed representative color.

2. The image processing apparatus as defined in claim 1 wherein said image restoring means generates said second pixel image by carrying out a series of procedures for restoring the pixel image on each of said blocks in addition to deciding on said representative colors.

3. The image processing apparatus as defined in claim 1 which comprises image interpolation means for generating said second pixel image by interpolating the colors on the pixel image generated by image restoring means.

4. The image processing apparatus as defined in claim 1 wherein said photo image processing means comprises:
   image smoothing means for generating said second pixel image by smoothing the colors on the pixel image generated by said image restoring means.

5. The image processing apparatus as defined in claim 1 wherein said color number compacting means comprises:
   region adjusting means for generating the optimum image blocks by changing the size of said image blocks on the basis of the statistical distribution of the color data of the pixels in said image blocks.

6. The image processing apparatus as defined in claim 5 wherein said region adjusting means comprises:
   luminance distribution deriving means for working out the mean luminance and luminance variance of the pixels in the object image block; and
   block uniting means for uniting an object image block and its neighboring image block in case the difference between the object image block and its neighboring image block in the calculated mean luminance and luminance variance is smaller than a specific value.

7. The image processing apparatus as defined in claim 1 wherein said outputting control language is a printer description language.

8. The image processing apparatus as defined in claim 1 wherein said outputting control language is a display control language adapted for the display unit.

9. The image processing apparatus as defined in claim 1 wherein said outputting control language is a language adapted for GDI (Graphical Device Interface).

10. An image processing apparatus for converting color image data described in control language of an output unit to a color image adapted for said output unit, said image processing apparatus comprising:
    object image separating means for separating said color image data into a command image generated by the a drawing command as a control language for every graphic or text and a photo image having color information of each pixel on the basis of information contained in said outputting control language;
    command image processing means for generating a first pixel image by performing said color-processing on the color data of said command image on the basis of color palette information given to a region specified by the drawing command;
    photo image processing means for generating a second pixel image; and
    image synthesizing means for generating said outputting image by synthesizing said first pixel image and said second pixel image; wherein
    the photo image processing means comprises
        color number compacting means for compacting the color image data of a photo image by clustering pixels within a specific area according to the color information of each pixel and deciding at least one representative color of the clustered pixel group,
    representative color processing means for color-processing of the representative color, and
    image restoring means for converting the photo image to a pixel image on the basis of the color-processed representative color.

11. An image processing apparatus for converting color image data described in control language of an output unit to a color image adapted for said output unit, image processing apparatus comprising:
    object image separating means for separating the color image data into a command image generated by a drawing command as a control language for every graphic or text and a photo image having color information of each pixel on the basis of information contained in the outputting control language;
    command image processing means for generating a first pixel image by performing said color-processing on the color data of the command image on the basis of color palette information given to a region specified by the drawing command;
    photo image processing means for generating a second pixel image; and
    image synthesizing means for generating the outputting image by synthesizing the first pixel image and the second pixel image, wherein
    the command image processing means comprises
        color palette information extracting means for extracting color palette information on said command image;
        extracted palette color processing means for performing said color-processing on the basis of said color palette information; and
        image drawing means for converting said command image into said first pixel image on the basis of said color-processed color palette information, and wherein the photo image processing means comprises color number compacting means for compacting the color image data of a photo image by clustering pixels within a specific area according to the color information of each pixel and deciding at least one representative color of the clustered pixel group, representative color processing means for color-processing of the representative color, and image restoring means for converting the photo image into the second pixel image on the basis of said color-processed representative color.

12. The image processing apparatus as defined in any one of claims 1, 10 and 11 wherein said color number compacting means comprises:

image dividing means for dividing said photo image into a plurality of image blocks; and representative color deciding means for deciding on at least one kind of representative color for each of said blocks on the basis of color data statistical distribution of pixels in said block.

13. The image processing apparatus as defined in claim 12 wherein said representative color deciding means comprises:

initializing means for deciding on an initial representative color vector from a group of color vectors with the color data—of the respective color pixels within a specific region obtained from the object image—as factor;

division axis deciding means for deciding on the axis direction in which each cluster obtained at the present moment is divided;

cluster dividing means for replacing the representative color vector of the object cluster with two tentative representative color vectors which are a certain distance apart with the present position of the representative color vector of the object cluster as center in the axis direction obtained by said division axis deciding means;

cluster representative deciding means far deriving representative color vectors representing the respective clusters by classifying into the respective clusters groups of all the color vectors within a specific region on the basis of the tentative representative color vectors obtained by said cluster dividing means; and convergence judging means for judging whether the representative color vectors converge by comparing the tentative representative color vector obtained by said cluster dividing means and the representative color vector obtained by said cluster representative deciding means.

14. The image processing apparatus as defined in claim 13 which further comprises cluster division end judging means for judging whether the number of the latest representative color vectors found converged by said convergence judging means and the clusters resented by them satisfies the pre-set specific number of cluster divisions.

15. The image processing apparatus as defined in claim 14 which comprises representative information outputting means for outputting the latest representative color vectors and information on the clusters to which the color vectors of the respective pixels belong—with regard to all the pixels within the object region area—when said cluster division end judging means judges that said cluster division is over.

16. The image processing apparatus as defined in claim 12, wherein said representative color deciding means comprises:

initializing means for deciding on an initial representative color vector from a group of color vectors with the color data—of the respective color pixels within a specific region obtained from the object image—as factor, in-cluster variance deriving means for calculating the variance of distance between the representative color representing the vectors clusters obtained at the present moment and the color vectors belonging to said clusters;

division suspension judging means for judging whether to divide the clusters on the basis of the variance of the respective clusters obtained by said in-cluster variance deriving means, division axis deciding means for—with regard to the respective clusters obtained at the present moment—deciding on the axis direction in which the clusters will be divided when said division suspension judging means judges that the division will not be suspended, cluster dividing means for replacing the representative color vector of the object cluster with two tentative representative color vectors which are a certain distance apart with the present position of the representative color vector of the object cluster as center in the axis direction obtained by said division axis deciding means;

cluster representative deciding means for deriving representative color vectors representing the respective clusters by classifying into the respective clusters groups of all the color vectors within a specific region on the basis of the tentative representative color vectors obtained by said cluster dividing means; and convergence judging means for judging whether the representative color vector converges by comparing the tentative representative color vector obtained by said cluster dividing means and the representative color vector obtained by said cluster representative deciding means.

17. The image processing apparatus as defined in claim 16 which further comprises cluster division end judging means for judging whether the number of the latest representative color vectors found converged by said convergence judging means and the clusters represented by them satisfies the pre-set specific number of cluster divisions.

18. The image processing apparatus as defined in claim 17 comprises representative information outputting means for outputting the latest representative color vectors and information on the clusters to which the color vectors of the respective pixels belong—with regard to all the pixels within the object region—when said cluster division end judging means judges that said cluster division is over.

19. The image processing apparatus as defined in any one of claims 1, 10 and 11 wherein said image restoring means generates said second pixel image by restoring pixel images in all said image blocks after said representative colors are decided on for all said image blocks.

20. An image processing apparatus for converting color image data described in control language of an output unit to a color image adapted for said output unit, said image processing apparatus comprising:

color number compacting means for compacting the color image data of a photo image by clustering pixels within a specific area according to the color information of each pixel and deciding at least one representative color of the clustered pixel group; and outputting control language converting means for converting to the control language of the output unit from the photo image data having the decided representative colors.

21. The image processing apparatus as defined in claim 20 which comprises photo image processing means for generating a second pixel image by performing said color-processing on the color data of said photo image in said outputting control language.

22. The image processing apparatus as defined in claim 21 wherein said photo image processing means comprises:
   image interpolation means for generating said second pixel image by interpolating the colors on the pixel image generated by said image restoring means.

23. The image processing apparatus as defined in claim 21 wherein said photo image processing means comprises:
   image smoothing means for generating said second pixel image by smoothing the colors on the pixel image generated by said image restoring means.

24. The image processing apparatus as defined in claim 20 which comprises:
   object image separating means for separating the color image data into a command image generated by a drawing command as a control language for every graphic and text and a photo image having color information of each pixel on the basis of information contained in the color image data;
   command image processing means for generating a first pixel image by performing said color-processing on color data of said command image on the basis of color palette information given to a region specified by the drawing command;
   photo image processing means for generating a second pixel image by performing said color-processing on the color data of said photo image; and
   image synthesizing means for generating said outputting image by synthesizing said first pixel image and said second pixel image, wherein
   the command image processing means comprises
      color palette information extracting means for extracting a color palette information on the command image;
      image drawing means for converting the command image into the first pixel image on the basis of the color-processed color palette information, and wherein the photo image processing means comprises
      representative color processing means for color-processing of the representative color, and
      image restoring means for converting the photo image into the second pixel image on the basis of said color-processed representative color.

25. The image processing apparatus as defined in claim 20 wherein said color number compacting means comprises:
   image dividing means for dividing said photo image into a plurality of image blocks; and
   representative color deciding means for deciding on at least one kind of representative color for each of said blocks on the basis of color data statistical distribution of pixels in said block.

26. The image processing apparatus as defined in claim 25 wherein said representative color deciding means comprises:
   initializing means for deciding on an initial representative color vector from a group of color vectors with the color data—of the respective color pixels within a specific region obtained from the object image—as factor,
   division axis deciding means for deciding on the axis direction in which the respective clusters obtained at the present moment are divided;
   cluster dividing means for replacing the representative color vector of the object cluster with two tentative representative color vectors which are a certain distance apart with the present position of the representative color vector of the object cluster as center in the axis direction obtained by said division axis deciding means;
   cluster representative deciding means for deriving representative color vectors representing the respective clusters by classifying into the respective clusters groups of all the color vectors within a specific region on the basis of the tentative representative color vectors obtained by said cluster dividing means; and
   convergence judging means for judging whether the representative color vector converges by comparing the tentative representative color vector obtained by said cluster dividing means and the representative color vector obtained by said cluster representative deciding means.

27. The image processing apparatus as defined in claim 26 which further comprises cluster division end judging means for judging whether the number of the latest representative color vectors found converged by said convergence judging means and the clusters represented by them satisfies the pre-set specific number of cluster divisions.

28. The image processing apparatus as defined in claim 27 which comprises representative information outputting means for outputting the latest representative color vectors and information on the clusters to which the color vectors of the respective pixels belong—with regard to all the pixels—when said cluster division end judging means judges that said cluster division is over.

29. The image processing apparatus as defined in claim 25 wherein said representative color deciding means comprises:
   initializing means for deciding on an initial representative color vector from a group of color vectors with the color data—of the respective color pixels within a specific region obtained from the object image—as factor;
   in-cluster variance deriving means for calculating the variance of distance between the representative color representing the vectors clusters obtained at the present moment and the color vectors belonging to the clusters;
   division suspension judging means for judging whether to divide the clusters on the basis of the variance of the respective clusters obtained by said in-cluster variance deriving means,
   division axis deciding means for deciding on the axis direction in which the respective clusters obtained at the present moment will be divided when said division suspension judging means judges that the division will not be suspended,
   cluster dividing means for replacing the representative color vector of the object cluster with two tentative representative color vectors which are a certain distance apart with the present position of the representative color vector of the object cluster as center in the axis direction obtained by said division axis deciding means;
   cluster representative deciding means for deriving representative color vectors representing the respective clusters by classifying into the respective clusters groups of all the color vectors within a specific region, on the basis of the tentative representative color vectors obtained by said cluster dividing means; and convergence judging means for judging whether the representative color vector converges by comparing the tentative representative color vector obtained by said cluster dividing means and the representative color vector obtained by said cluster representative deciding means.

30. The image processing apparatus as defined in claim 29 which further comprises cluster division end judging means for judging whether the number of the latest representative color vectors found converged by said convergence judging means and the clusters represented by them satisfies the pre-set specific number of cluster divisions.

31. The image processing apparatus as defined in claim 28 which comprises representative information outputting means for outputting the latest representative color vectors and information on the clusters to which the color vectors of the respective pixels belong—with regard to all the pixels—when said cluster division end judging means judges that said cluster division is over.

32. The image processing apparatus as defined in claim 20 wherein said color number compacting means comprises;
region adjusting means for generating the optimum image blocks by changing the size of said image blocks on the basis of the statistical distribution of the color data of the pixels in said image blocks.

33. The image processing apparatus as defined in claim 32 wherein said region adjusting means comprises:
luminance distribution deriving means for working out the mean luminance and luminance variance of the pixels in the object image block; and
block uniting means for uniting an object image block and its neighboring image block in case the difference between the object image block and its neighboring image block in the calculated mean luminance and luminance variance is smaller than a specific value.

34. The image processing apparatus as defined in claim 20, further comprising photo image processing means provided with:
representative color processing means for color-processing of the representative color; and
image restoring means for converting the photo image into the second pixel image on the basis of the color-processed representative color.

35. The image processing apparatus as defined in claim 21 or claim 34 wherein said photo image processing means comprising:
representative color processing means for color-processing of said representative color; and
image restoring means for converting said photo image into said second pixel image on the basis of said color-processing representative color.

36. The image processing apparatus as defined in claim 35 wherein said image restoring means generates said second pixel image by restoring pixel images in all said image blocks after said representative colors are decided on for all said image blocks.

37. The image processing apparatus as defined in claim 35 wherein said image restoring means generates said second pixel image by carrying out a series of procedures for restoring the pixel image on each of said blocks in addition to deciding on said representative colors.

38. An image processing apparatus for converting color image data described in control language of an output unit to a color image adapted for said output unit, said image processing apparatus comprising:
object image separating means for separating said color image data into a command image generated by a drawing command as a control language for every graphic and text and a photo image having color information of each pixel on the basis of information contained in the color image data;
color number compacting means for compacting the color image data of a photo image by clustering pixels within a specific area according to the color information of each pixel and deciding at least one representative color of the clustered pixel group; and
outputting control language converting means for converting to the control language of the output unit from the photo image data having the decided representative colors.

39. The image processing apparatus as defined in claim 38 which comprises command image processing means for generating a first pixel image by performing said color-processing on color data of said command image in said outputting control language on the basis of color palette information given to the bits belonging to a region specified by the drawing command.

40. The image processing apparatus as defined in claim 39 wherein said command image processing means comprises:
color palette information extracting means for extracting said color palette information on said command image;
extracted palette color processing means for performing said color-processing on the basis of said color palette information; and
image drawing means for converting said command image into said first pixel image on the basis of said color-processed color palette information.

41. An image processing method for converting color image data described in control language of an output unit to a color image adapted for said output unit, the image processing method comprising the steps of:
compacting the color image data of a photo image by clustering pixels within a specific area according to the color information of each pixel and deciding on at least one representative color of the clustered pixel group;
color-processing said representative colors; and
restoring an image by converting said photo image into a pixel image on the basis of said color-processed representative colors.

42. The image processing method as defined in claim 41 wherein said photo image processing step divides the photo image into a plurality of blocks, decides at least one representative color within each of said image blocks and performs color-processing on said representative color.

43. The image processing method as defined in claim 41 wherein said outputting control language is Printer Description Language.

44. The image processing method as defined in claim 41 wherein said outputting control language is a display control language adapted for the display unit.

45. The image processing method as defined in claim 41 wherein said outputting control language is a language adapted for GDI (Graphical Device Interface).

46. An image processing method for converting color image data described in control language of an output unit to a color image adapted for said output unit, said image processing method comprising the steps of:
separating said color image data into a command image generated by a drawing command as a control language for every graphic or text and a photo image having color information of each pixel on the basis of information contained in said outputting control language;
processing the command image to generate a first pixel image by performing the steps of extracting color palette information on the command image, color-processing on the basis of the color palette information, and converting the command image into the first pixel image on the basis of the color-processed color palette information; and processing the photo image for generating a second pixel image by performing the steps of compacting the color image data of the photo image by clustering pixels within a specific area according to the color information of each pixel and deciding at least one representative color of the clustered pixel group, color-processing the representative color, and converting the photo image into the second pixel image on the basis of the color-processed representative color; and generating said outputting image by synthesizing said first pixel image and said second pixel image.

47. An image processing method for converting color image data described in control language of the output unit to a color image adapted for said output unit, said image processing method comprising the steps of:

compacting the color image data by clustering pixels within a specific area according to the color information of each pixel and deciding at least one representative color of the clustered pixel group; and converting to the control language of the output unit from said photo image data having the decided representative colors.

48. The image processing method as defined in claim 47 which further comprises the steps of:

color-processing said representative colors on the photo image converted into said outputting control language; and restoring an image by converting said photo image into said second pixel image on the basis of said color-processed representative color.

49. An image processing method for converting color image data described in control language of an output unit to a color image adapted for said output unit, said image processing method comprising the steps of:

separating said color image data into a command image generated by a drawing command as a control language for every graphic or text and a photo image having color information of each on the basis of information contained in said outputting control language;

compacting the color data of the photo image by clustering pixels within a specific area according to the color information of each pixel and deciding at least one representative color from color information of the clustered pixels; and converting to the control language of the output unit from said photo image data having the decided representative colors.

50. A recording medium in which an image processing procedure for generating an outputting image by color-processing for converting a color image described in an outputting control language adapted for the output unit being used into color data adapted for the output unit is recorded as computer program wherein the following steps are recorded as the photo image processing procedure for processing a photo image having color information by a pixel generated from a pixel image:

compacting the color data of the photo image to decide on at least one kind of representative color;

color-processing said representative colors; and restoring an image by converting said photo image into a pixel image on the basis of said color processed representative color.

51. The recording medium as defined in claim 50 wherein the following steps are recorded:

color number compacting step for deciding on at least one representative color by compacting the color data of said photo image;

representative color-processing step for color-processing said representative color; and image restoring step for converting said photo image into said second pixel image on the basis of said color-processed representative color.

52. A recording medium in which an image processing procedure for generating an outputting image by color-processing for converting a color image described in an outputting control language adapted for the output unit being used into color data adapted for the output unit is recorded as computer program wherein the following steps are recorded:

object image separating step for separating said color data into a command image generated by a drawing command and a photo image having color information by a pixel generated by the bit map data on the basis of information contained in said outputting control language;

command image processing step for generation of the first bit map image by color-processing the color data of said command image on the basis of color palette information given to bits belonging to a region specified by said drawing command;

photo image processing step for generation of the second pixel image by performing said color-processing on the color data of said photo image; and image synthesizing step for generating said outputting image by synthesizing said first pixel image and said second pixel image.

53. A recording medium in which an image processing procedure for generating an outputting image by converting color image data prepared by application into an outputting control language adapted for the output unit being used, holding in a memory storage and at the same time performing color-processing for converting into color data adapted for the output unit is recorded as computer program wherein the following steps are recorded:

color number compacting step for deciding at least one kind of representative color by compacting the color data of the photo image having color information by a pixel generated from bit map data contained in said color image data; and outputting control language converting step for converting into the outputting control language said photo image of which said representative color is decided on.

54. A recording medium in which an image processing procedure for generation of an outputting image by converting color image data prepared by application into an outputting control language and holding the data in a memory storage and at the same time by color-processing for conversion into color data adapted for said output unit is recorded as computer program wherein the following steps are recorded:

object image separating step for separating said color image data into a command image generated by a drawing command and a photo image having color information by a pixel generated by the bit map data on the basis of information contained in said color image data;

color number compacting step for deciding on at least one representative color by compacting the color data of said photo image; and outputting control language converting step for converting into the outputting control language said command image and said photo image of which said representative color is decided on.

55. The recording medium as defined in claim 54 wherein the following steps are recorded:

representative color processing step for further color-processing said representative color on the photo image converted into said outputting control language; and image restoring step for converting said photo image into said second pixel image on the basis of said color-processed representative color.

* * * * *

UNITED STATES PATENT AND TRADEMARK OFFICE
CERTIFICATE OF CORRECTION

PATENT NO. : 7,023,577 B2  Page 1 of 1
APPLICATION NO. : 09/725946
DATED : April 4, 2006
INVENTOR(S) : Tatsumi Watanabe et al.

It is certified that error appears in the above-identified patent and that said Letters Patent is hereby corrected as shown below:

Column 16, line 37, after the word "unit" insert -- the --
Column 17, line 38, change "far" to -- for --
Column 17, line 54, change "resented" to -- represented --
Column 18, line 43 to 44, after "Claim 28" insert -- which --
Column 21, line 13, change "claim 28" to -- claim 30 --

Signed and Sealed this

Twenty-first Day of November, 2006

JON W. DUDAS
*Director of the United States Patent and Trademark Office*